United States Patent
Shaashua et al.

(10) Patent No.: US 9,871,865 B2
(45) Date of Patent: Jan. 16, 2018

(54) PHYSICAL ENVIRONMENT PROFILING THROUGH INTERNET OF THINGS INTEGRATION PLATFORM

(71) Applicant: Neura, Inc., Sunnyvale, CA (US)

(72) Inventors: Triinu Magi Shaashua, Sunnyvale, CA (US); Ori Shaashua, Sunnyvale, CA (US)

(73) Assignee: NEURA, INC., Sunnyvale, CA (US)

( * ) Notice: Subject to any disclaimer, the term of this patent is extended or adjusted under 35 U.S.C. 154(b) by 223 days.

(21) Appl. No.: 14/315,031

(22) Filed: Jun. 25, 2014

(65) Prior Publication Data

US 2015/0019714 A1    Jan. 15, 2015

Related U.S. Application Data

(60) Provisional application No. 61/883,902, filed on Sep. 27, 2013, provisional application No. 61/845,369, filed on Jul. 11, 2013.

(51) Int. Cl.
  *G06F 15/16* (2006.01)
  *H04L 29/08* (2006.01)
  (Continued)

(52) U.S. Cl.
  CPC ............. *H04L 67/12* (2013.01); *H04L 67/24* (2013.01); *H04W 4/005* (2013.01); *H04L 67/303* (2013.01); *H04W 4/023* (2013.01)

(58) Field of Classification Search
  CPC ....... H04L 67/12; H04L 67/24; H04L 67/303; H04W 4/005; H04W 4/023
  (Continued)

(56) References Cited

U.S. PATENT DOCUMENTS

| | | | |
|---|---|---|---|
| 6,601,026 B2 * | 7/2003 | Appelt | G06F 17/30616 704/9 |
| 7,216,179 B2 * | 5/2007 | Ott | H04L 29/06 709/227 |
| 7,609,651 B1 | 10/2009 | McBride et al. | |
| 7,921,686 B2 | 4/2011 | Bagepalli et al. | |
| 8,271,878 B2 | 9/2012 | Kane et al. | |
| 8,280,009 B2 * | 10/2012 | Stepanian | G06F 21/10 348/14.04 |
| 8,489,596 B1 | 7/2013 | Milton et al. | |
| 8,881,257 B2 | 11/2014 | Cha et al. | |
| 8,965,845 B2 | 2/2015 | Calo et al. | |

(Continued)

FOREIGN PATENT DOCUMENTS

| | | |
|---|---|---|
| CN | 101833710 A | 9/2010 |
| CN | 101916106 A | 12/2010 |

(Continued)

OTHER PUBLICATIONS

International Search Report and Written Opinion mailed Dec. 11, 2014, for International Application No. PCT/US2014/044857, International Filing Date Jun. 30, 2014, 6 pp.

(Continued)

*Primary Examiner* — Moustafa M Meky
*Assistant Examiner* — Thorne E Waugh
(74) *Attorney, Agent, or Firm* — Perkins Coie LLP

(57) ABSTRACT

A method of profiling a physical environment via Internet of Things (IoT) devices connected via an IoT integration platform is disclosed. The method includes: receiving data streams from network-capable devices connected to the IoT integration platform; detecting presence of an entity in a physical environment surrounding or interacting with one or more of the network-capable devices from a subset of the data streams; storing an entity profile on a node graph representing the physical environment, wherein each entity profile is associated at least one of the network-capable device from which the presence is detected; and requesting a semantic label of the entity profile from a user of a first user account via one or more user interfaces.

20 Claims, 20 Drawing Sheets

(51) Int. Cl.
    *H04W 4/00*     (2009.01)
    *H04W 4/02*     (2009.01)

(58) Field of Classification Search
    USPC .................................................. 709/203–248
    See application file for complete search history.

(56) References Cited

U.S. PATENT DOCUMENTS

| | | | |
|---|---|---|---|
| 9,325,468 B2* | 4/2016 | Mitola, III | H04L 5/0037 |
| 9,372,922 B2 | 6/2016 | Shaashua et al. | |
| 9,509,788 B2* | 11/2016 | Pal | G06Q 30/0201 |
| 9,594,907 B2* | 3/2017 | Duke | G06F 21/566 |
| 2005/0193222 A1 | 9/2005 | Greene et al. | |
| 2007/0112574 A1 | 5/2007 | Greene | |
| 2009/0006469 A1 | 1/2009 | Jain et al. | |
| 2009/0063665 A1 | 3/2009 | Bagepalli et al. | |
| 2009/0089078 A1 | 4/2009 | Bursey | |
| 2009/0171906 A1 | 7/2009 | Adams et al. | |
| 2011/0218037 A1 | 9/2011 | Singh et al. | |
| 2012/0079092 A1 | 3/2012 | Woxblom et al. | |
| 2012/0150642 A1 | 6/2012 | Kandanala et al. | |
| 2012/0244885 A1 | 9/2012 | Hefetz et al. | |
| 2012/0284777 A1* | 11/2012 | Eugenio | H04L 67/20 726/4 |
| 2012/0296909 A1 | 11/2012 | Cao et al. | |
| 2012/0303618 A1 | 11/2012 | Dutta et al. | |
| 2013/0258953 A1 | 10/2013 | Huang et al. | |
| 2014/0047322 A1 | 2/2014 | Kim et al. | |
| 2014/0181947 A1 | 6/2014 | Lund et al. | |
| 2014/0241354 A1 | 8/2014 | Shuman et al. | |
| 2014/0244834 A1* | 8/2014 | Guedalia | H04L 67/16 709/224 |
| 2014/0310243 A1 | 10/2014 | McGee et al. | |
| 2014/0330959 A1 | 11/2014 | Zhang | |
| 2014/0380264 A1 | 12/2014 | Misra et al. | |
| 2015/0006695 A1* | 1/2015 | Gupta | H04L 41/32 709/223 |
| 2015/0019342 A1* | 1/2015 | Gupta | G06Q 30/0269 705/14.66 |
| 2015/0019553 A1 | 1/2015 | Shaashua et al. | |
| 2015/0019710 A1 | 1/2015 | Shaashua et al. | |
| 2015/0039635 A1 | 2/2015 | Monjas | |

FOREIGN PATENT DOCUMENTS

| | | | |
|---|---|---|---|
| CN | 201732463 U | 2/2011 | |
| CN | 102215150 A | 10/2011 | |
| CN | 102271379 A | 12/2011 | |
| CN | 102440009 A | 5/2012 | |
| CN | 102687486 A | 9/2012 | |
| CN | 102694804 A | 9/2012 | |
| CN | 202856780 U | 4/2013 | |
| CN | 202870941 U | 4/2013 | |
| CN | 103106553 A | 5/2013 | |
| WO | 2013045964 A1 | 4/2013 | |
| WO | 2013046021 A2 | 4/2013 | |
| WO | 2013051009 A2 | 4/2013 | |
| WO | WO 2013046021 A2 * | 4/2013 | H04L 41/046 |
| WO | 2013072925 A2 | 5/2013 | |
| WO | 2013046021 A3 | 7/2013 | |
| WO | 2013051009 A3 | 7/2013 | |

OTHER PUBLICATIONS

Final Office Action mailed Nov. 5, 2015, for U.S. Appl. No. 13/957,255 of Shaashua et al. filed Aug. 1, 2013.
International Search Report and Written Opinion mailed Dec. 25, 2014, for International Application No. PCT/US2014/043923, International Filing Date Jun. 24, 2014, 5 pp.
International Search Report mailed Jan. 29, 2015, for International Application No. PCT/2014/043915, International Filing Date Jun. 24, 2014, 2 pp.
Non-Final Office Action Mailed Jul. 30, 2015 of U.S. Appl. No. 13/957,259 by Shaashua, T.M., et al., filed Aug. 1, 2013.
Non-Final Office Action mailed Mar. 2, 2015, for U.S. Appl. No. 13/957,255 of Shaashua et al. filed Aug. 1, 2013.
Notice of Allowance mailed Jan. 13, 2016, for U.S. Appl. No. 13/957,259 of Shaashua et al. filed Aug. 1, 2013.
Notice of Allowance mailed Feb. 26, 2016, for U.S. Appl. No. 13/957,259 of Shaashua et al. filed Aug. 1, 2013.
Andreev, Sergey et al., "Internet of Things, Smart Spaces, and Next Generation Networking", 20121-478. (Part 1 pp. 1-239).
Andreev, Sergey et al., "Internet of Things, Smart Spaces, and Next Generation Networking", 2012pp. 1-478. (Part 2 pp. 240-478).
Barnaghi, "Sensei: An Architecture for the Real World Internet", First International Workshop on Sematic Interoperability for Smart Spaces (SSIS 2010), www//ieee-iscc.org/2010/web_pages/siss/presentation/keynote.pdf, Jun. 30, 2009, pp. 1-77.
Bauer, et al., "IoT Architecture Reference Model (IoT ARM)", Chapter 7 IoT Reference Model, 2013, pp. 1-50.
Breslin, et al., "The Future of Social Networks on the Internet", 2007, pp. 86-90.
Carrez, Francois, "Internet of Things—Architecture", IoT-A, Deliverable D1.5—Final architectural reference model for the IoT v3.0, 2013, pp. 1-499. (Part 1 pp. 1-250).
Carrez, Francois, "Internet of Things—Architecture", IoT-A, Deliverable D1.5—Final architectural reference model for the IoT v3.0, 2013,pp. 1-499. (Part 2 pp. 251-499).
Celesti, et al., "How the Dataweb Can Support Cloud Federation: Service Representation and Secure Data Exchange", 2012 Second Symposium on Network Cloud Computing and Applications, 2012, pp. 73-79.
Gena, et al., "The Evauation of a Social Adaptive Website for Cultural Events" 2011, pp. 1-49.
Gronbaek, Inge , "Architecture for the Internet of Things (IoT): API and interconnect", 2008, pp. 803-807.
Gubbi, et al., "Internet of Things (IoT): A vision, architectural elements, and future directions", Jan. 2013, pp. 1645-1660.
Harbor Research, "How the Internet of Things, Social Networks & Creative Collaboration Will Shape Future Market Structure", 2009, 19 pages.
Heflin, et al., "Semantic Interoperability on the Web", 2000, pp. 1-15.
Hornsby, "From Instant Messaging to Cloud Computing, an XMPP review", 2010, 6 pages.
Lloret, et al., "Ubiquitous Monitoring of Electrical Household Appliances", 2012, 19 pages.
Merriam-Webster, "Recommendation" 2015, 1 page.
Miorandi, et al., "Internet of Things: Vision, applications and research challenges" 2012, pp. 1-20.
Molina, "Semantic middleware development for the Internet of Things", Universidad Politecnica de Madrid, 2012, pp. 1-207.
Musial, et al., "Social Networks on the Internet", Jan. 2012, pp. 31-72.
Pal, et al., "Intelligent Social Network of Devices", Computational Social Networks: Tools Perspectives and Applications, 2012, pp. 329-348.
Serbanati, et al., "Building Blocks of the Internet of Things: State of the Art and Beyond", 2011, pp. 351-367.
Shah, et al., "The Internet of Things: Technologies, Communications and Computing", 2014, pp. 1-52.
Tapiador, t al., "Social Stream, a social network framework", 2012, pp. 52-57.
Van Kranenburg, et al., "The Internet of Things", Oct. 2011, pp. 1-83.
Weber, "Internet of things—Need for a new legal environment?", 2009, pp. 1-499.
Zhou, "The Internet of Things in the Cloud: A Middleware Perspective", Table of Contents, 2012, pp. 1-4.
U.S. Appl. No. 15/181,191 of Shaashua et al. filed Jun. 13, 2016.
Notice of Allowance dated Oct. 21, 2016, for U.S. Appl. No. 13/957,255 by Shaashua, Triinu M. et al., filed Aug. 1, 2013.
U.S. Appl. No. 15/366,274 by Shaashua, Triinu M. et al., filed Dec. 1, 2016.

(56) References Cited

OTHER PUBLICATIONS

European Search Report and Written Opinion PCT/US2014043915 dated Feb. 3, 2017, pp. 1-8.
Huang, Yinghui, et al., "A Semantic Analysis for Internet of Things", Int'l Conference on Intelligent Computation Technology and Automation, 2010, pp. 336-339.
Sheth, Amit, "Computing for Human Experience—Semantics-Empowered Sensors, Services, and Social Computing on the Ubiquitous Web", IEEE Internet Computing, 2010, pp. 88-91.
U.S. Appl. No. 15/413,158 of Shaashua et al. filed Jan. 23, 2017.
Extended European Search Report dated Feb. 28, 2017, for European Patent Application No. EP14823675.5 (based on PCT/US2014/044857), pp. 1-8.
Extended European Search Report dated Mar. 13, 2017, for European Patent Application No. 14823306.7 (based on PCT/US2014043923), 5 pages.
Etsi, TR. 101 584 V0.5.0 (DRAFT), "Machine to Machine Communications (M2M): Study on Semantic support for M2M Data", Dec. 2012, 37 pages.
First Office Action dated Jun. 2, 2017, for Chinese Patent Application No. 201480050203.X, 14 pages.
First Office Action dated Jul. 4, 2017, for Chinese Patent Application No. 201480050200.6.
First Office Action dated Jul. 25, 2017, for Chinese Patent Application No. 201780050216.7, 33 pages.

* cited by examiner

PHYSICAL ENVIRONMENT PROFILING THROUGH INTERNET OF THINGS INTEGRATION PLATFORM

CROSS-REFERENCE TO RELATED APPLICATIONS

This application claims the benefit of U.S. Provisional Patent Application Ser. No. 61/883,902, filed Sep. 27, 2013, which is incorporated by reference herein in its entirety. This application also claims the benefit of U.S. Provisional Patent Application Ser. No. 61/845,369, filed Jul. 11, 2013, which is incorporated by reference herein in its entirety.

RELATED FIELD

This disclosure relates generally to the technical areas of the Internet of Things.

BACKGROUND

The Internet of Things (IoT) refers to uniquely identifiable devices and their virtual representations in an Internet-like structure. The concept of IoT devices includes networked devices ("connected devices") capable of communicating with a server or with a mobile application via a network connection other devices ("connected device"). The networked devices may include passive and active devices, where the passive devices may achieve network connectivity through interactions with the active devices. IoT devices are intended to achieve ubiquitous connection for intelligent perception, identification and management of items and processes. Many considers IoT as the third wave of development of information industry following the computer and the Internet. However, solutions for management of IoT devices are generally vertical solutions.

DISCLOSURE OF TECHNOLOGY

Disclosed is a technology that profiles a physical environment from a user's perspective though an Internet of Things integration platform. The integration platform may connect with a number of IoT devices even when the IoT devices each has its own vertical application/backend system solutions. The integration platform may catalogue a physical environment around a particular user based on the connected IoT devices. The physical environment may be represented by contextual nodes including people, places, events, devices, activities, or any combination thereof. Each of the contextual nodes can be profiled by the IoT platform. The node profiles may be shared from user to user through a transformation mechanism that shifts the semantics of the node profiles from one user to another The technology enables the integration platform to connect to not only devices, but also other physical entities, such as places and people ("Internet of Everything"). The technology is a consumer solution to consolidate and automate users' connected environment. The technology can identify and profile connected devices around a consumer, communicate with the connected devices, and create logical connections amongst people, devices, locations, digital channels, or any combination thereof based on the profiles of the physical entities.

The technology may be implemented by the integration platform. The integration platform may include a consolidation interface, a data correlation module, a data analysis module, and a rule development module. The consolidation interface is a centralized interface accessible via one or more of the networked devices. The consolidation interface may include a rule creation interface. The consolidation interface may include an interactive visual component including an interactive user interface and visual recognition of places, situations, and people, an interactive audio component including voice control, an interactive gesture component, or any combination thereof. The consolidation interface provides a single interface to view/edit consolidated data and to interact with the networked devices, such as via the rule creation interface. The data correlation module associates data and metadata from the networked devices to relate these data and/or metadata to a user. The data analysis module analyzes the collected data and metadata to determine specific semantic label or context relevant to the user. The rule management module enables configuration, adjustments, and interactions with the networked devices based on user-profile, context, event trigger, user behavior, social interactions, user configurations, or any combination thereof.

The rule management module may embody these configurations, adjustments, and interactions in one or more interoperable rules. These interoperable rule may be executed on the connected devices. The interoperable rules may be implemented in reference to any node, such as any person, place, device, group, or other entity, thing or object. Because of context recognition as enabled by the data analysis module, the one or more interoperable rules for each node may be designed and manipulated in context.

Some embodiments of the disclosure have other aspects, elements, features, and steps in addition to or in place of what is described above. These potential additions and replacements are described throughout the rest of the specification

The figures depict various embodiments of the technology for purposes of illustration only. One skilled in the art will readily recognize from the following discussion that alternative embodiments of the structures and methods illustrated herein may be employed without departing from the principles of the technology described herein.

DETAILED DESCRIPTION

Integration

Figure 1A:
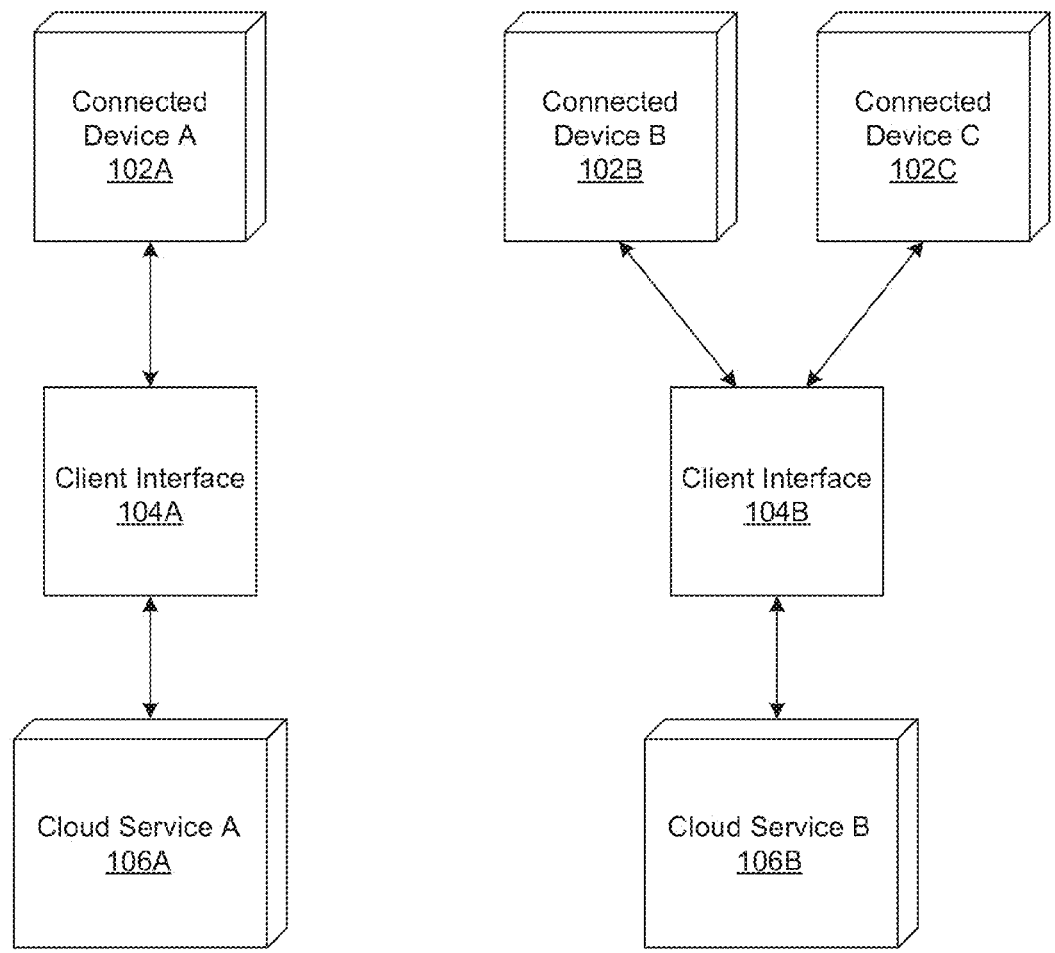
FIG. 1A is a block diagram illustrating vertical solutions provided for connected devices.

Every day more and more newly connected devices are introduced into the market each offering a vertical solution with a specific functionality. All these various solutions do not communicate to each other. For example, FIG. 1A is a block diagram illustrating vertical solutions provided for connected devices, such as device-A 102A, device-B 102B, and device C 102C (collectively "devices 102"). Each connected devices service provider may have its own vertical solution with a client interface (e.g., mobile or web), such as interface-A 104A and interface-B 104B (collectively "interfaces 104"), and one or more cloud services for computation, such as cloud service-A 106A or cloud service-B 106B (collectively "cloud services 106").

Figure 1B:
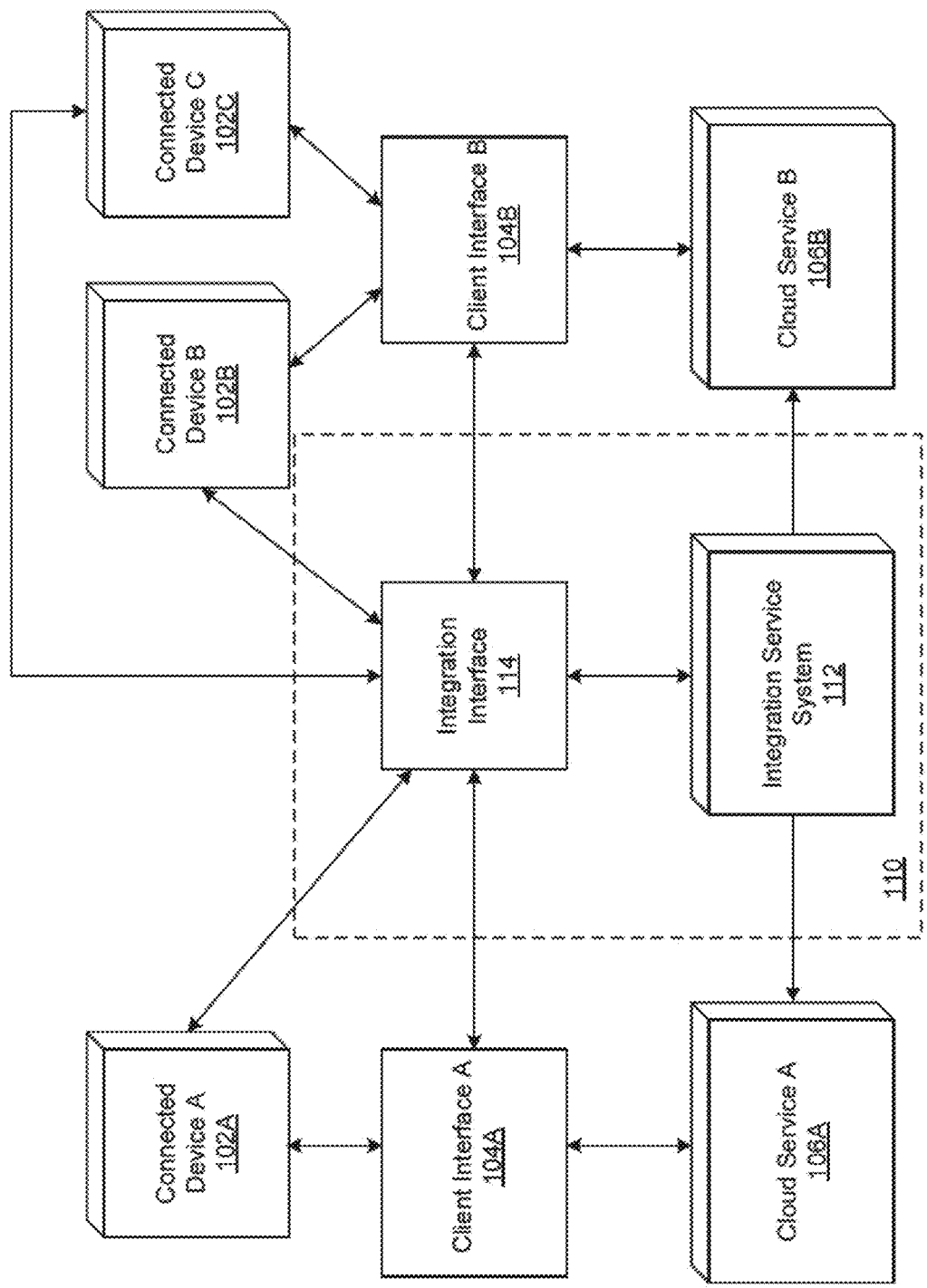
FIG. 1B is a block diagram illustrating an integration platform operating in conjunction with the vertical solutions.

Different devices 102 use different communications protocols made by different manufacturers. The integration platform may act as single point of interaction enabling cross-device and cross technology communication. FIG. 1B is a block diagram illustrating an integration platform operating in conjunction with the vertical solutions. The integration platform may be implemented through communication integration, including an unified application programming interface (API), unified software development kit (SDK), unified protocol(s), and/or interoperability interfaces between different connected devices. The integration platform mainly can be implemented by an integration service system 112 (e.g., the computer system 500 of FIG. 5) and an integration interface 114 (e.g., mobile or web). The integration service system 112 may provide different services for integration of the IoT devices 102 and for providing an execution environment for applications related to the use of the IoT devices 102. The integration interface 114 may be a software application that runs on a local computing device that is capable of managing or integrating the IoT devices 102 within a local network.

System Environment

Figure 2:
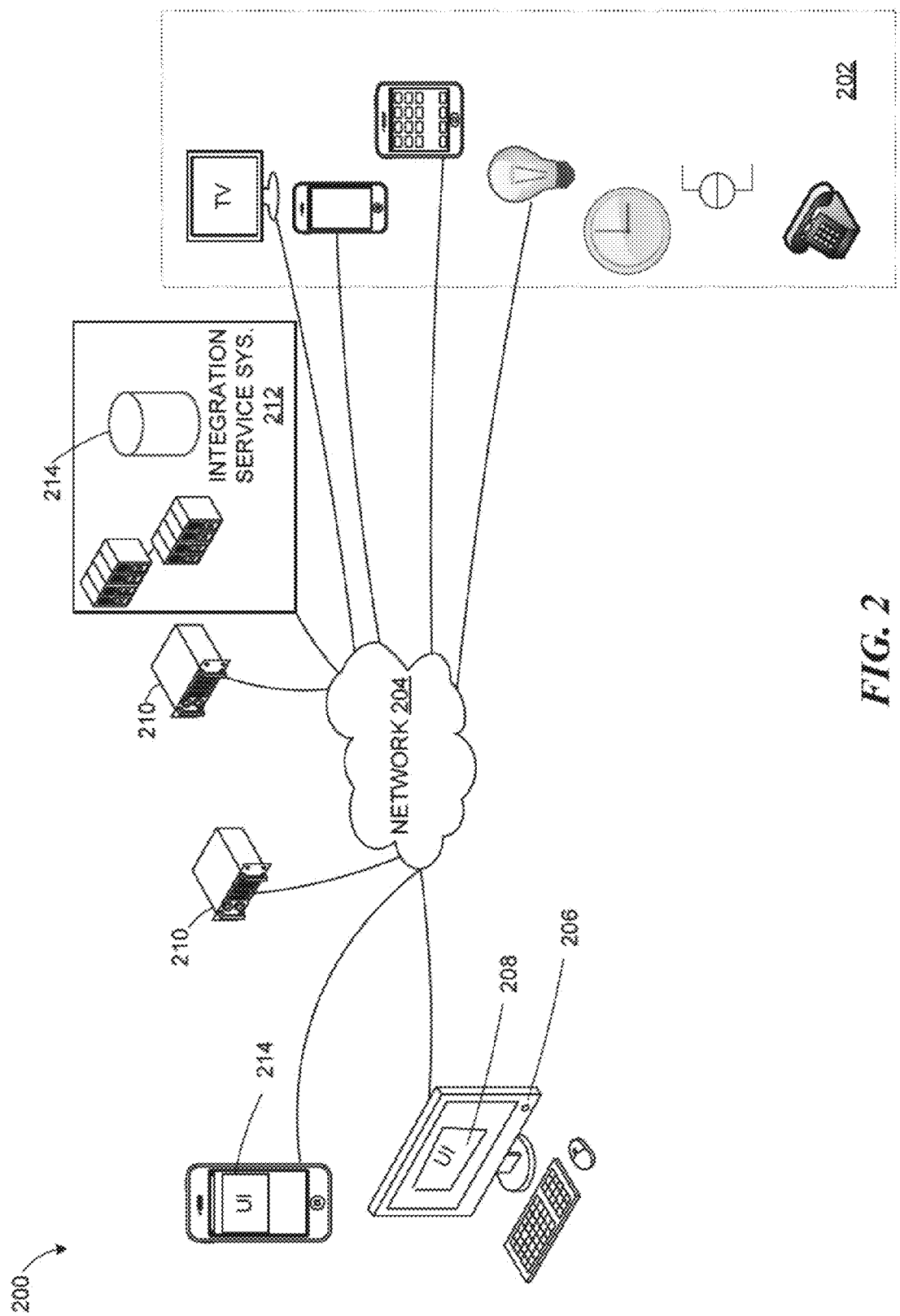
FIG. 2 is a block diagram illustrating an example system environment of an internet of things (IoT) integration platform system.

FIG. 2 is a block diagram illustrating an example system environment of an internet of things (IoT) integration platform system 200. The IoT integration platform system 200 includes IoT devices 202, such as the IoT devices 102 of FIG. 1. IoT devices 202, for example, can be smart phones, smart watches, smart sensors (e.g., mechanical, thermal, electrical, magnetic, etc.), networked appliances, networked peripheral devices, networked lighting system, communication devices, networked vehicle accessories, smart accessories, tablets, smart TV, computers, smart security system, smart home system, other devices for monitoring or interacting with or for people and/or places, or any combination thereof. The IoT devices 202 may include the wireless device 600 of FIG. 6. The IoT devices 202 may include one or more of the following components: sensor, radio frequency identification (RFID) technology, global positioning system technology, mechanisms for real-time acquisition of data, passive or interactive interface, mechanisms of outputting and/or inputting sound, light, heat, electricity, mechanical force, chemical presence, biological presence, location, time, identity, other information, or any combination thereof.

The IoT device 202 are connected via a network 204. The network 204 may include different channels of communication and may include local networks therein. For example, the network 204 may include wireless communication through cellular networks, WiFi, BlueTooth, Zigbee, or any combination thereof. The network 204 may include one or more switches and/or routers, including wireless routers that connect the wireless communication channels with other wired networks (e.g., the Internet). A local network may exist that connects a local set of the IoT device 202. For example, the local network may be established by a local router or a local switch.

For example, the IoT device 202 may be connected to a control device 206 within the local network. The control device 206 may be a computer, a networked device, or a mobile device, such as the wireless device 600. The control device 206 may include an interface implemented by a solution-specific application 208. An IoT device may be coupled to the solution-specific application 208, where the solution-specific application 208 is created specifically to communicate with such devices as part of a vertical solution. The solution-specific application 208 may be able to control the IoT device or to access data from the IoT device.

IoT devices may also communicate with a solution-specific service server system 210. For example, a networked lighting system may communicate with the solution-specific service system 210 keeping track of whether lights are on/off on the solution-specific service system 210. The solution-specific service system 210 can create an interface to share that data and/or to interact with the IoT devices. The interface may be accessible through the solution-specific application 208 or through a browser.

The technology disclosed includes an integration service system 212, such as the integration service system 112, and an integration interface 214, such as the integration interface 114, that can manage or integrate multiple instances of the IoT devices 202 and co-exist with the vertical solutions. The integration interface 214 may run on the control device 206. The integration interface 214 may be a computing application, a web page, other interactive interface operable on a computing device. The disclosed integration service system 212 and/or the integration interface 214 overcome the challenge of user inconvenience. Vendors who manufacture IoT devices 202 do not have a consistent standard to provide a unified interface. The proposed system provide a technology including specific modules and processes to coordinate with the multiple IoT devices 202, the multiple solution-specific applications 208, and the multiple solution-specific service server systems 210.

The integration service system 212 may include a profile store 214 of IoT devices 202 and other context relevant entities. For example, context relevant entities may include people, places, groups, physical objects, brands, things, or any combination thereof. Some of the context relevant entities in the integration service system 212 may not include any networking capabilities, but may be observed through the connected IoT devices 202 either directly or indirectly. The integration service system 212 may profile these entities, such as via a data analysis module 308 described below in FIG. 3, and store these entity profiles in the profile store 214 for reference. Interaction with these profiled entities may be enabled by visual identification (e.g., image recognition), voice recognition, motion detection, geo-location, other input data to the IoT devices 202, or any combination thereof.

As an example, an IoT device 202 with a camera can recognize a known user is in front of a plate and fork (e.g., within a context of "eating"). Such recognition may trigger an increase of the known user's target daily steps in his/her activity monitor (e.g., due to higher calorie intake), or trigger the known user's coffee machine to prepare an espresso. In this example the plate and fork do not have network capability, but do have profiles in the profile store 214. The recognition of the profiles may be a trigger for an action in the connected devices.

As another example, detecting proximity to a person (e.g., a child) or a place (e.g., a child's room) may trigger wearable IoT devices 202 (e.g., sensors) on the child to synchronize relevant data to the integration service system 212, such as the child's glucose level. The integration service system 212 may respond to this trigger by analyzing the relevant data, and visualizing a relevant correlative insight (e.g., "inject more insulin") based on the analyzed data on a parent's smartphone or wearable device. The integration service system 212 may further execute an interoperable rule upon detection of the trigger, such as by sending a command to another IoT device (e.g., an insulin pump). In this example, the trigger may be based on a contextual or semantic profiling of a person or place, and not necessarily another device.

System Architecture

Figure 3:
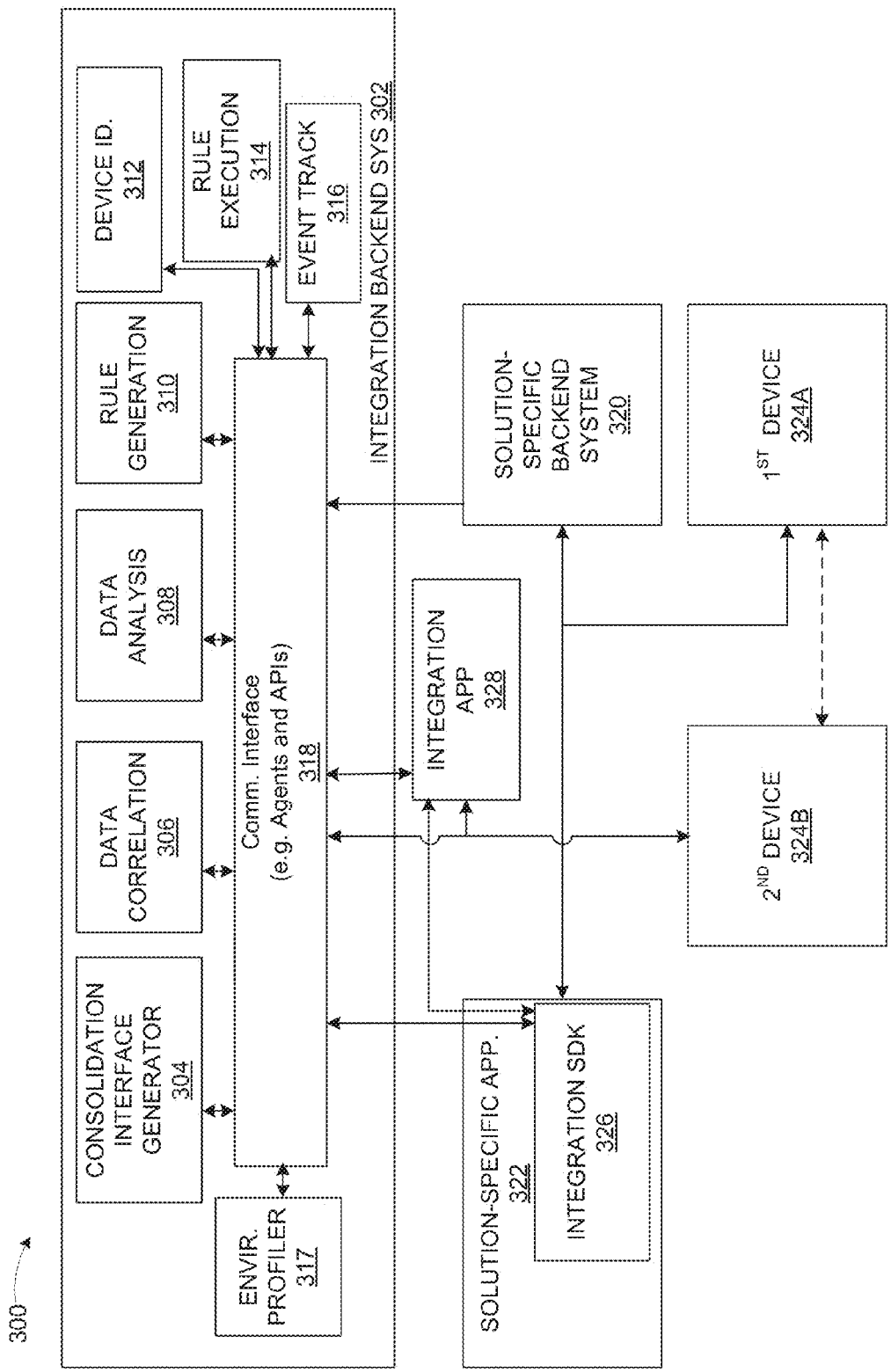
FIG. 3 is a block diagram illustrating the IoT integration platform system.

FIG. 3 is a block diagram illustrating the IoT integration platform system 300. The modules therein may be implemented by a computer system, such as the computer system 500 of FIG. 5. The IoT integration platform system 300 may include an integration backend system 302, such as the integration service system 212 of FIG. 2. The integration backend system 302 may include a consolidation interface generator 304, a data correlation module 306, a data analysis module 308, a rule generation module 310, a device identification module 312, a rule execution module 314, an event track module 316, and an environment profiler module 317. The integration backend system 302 may also include a communication interface module 318 for interfacing with the IoT devices and/or client interfaces.

The IoT integration platform system 300 may enable integration of vertical solutions of IoT devices, such as the vertical solutions illustrated in FIG. 1A and FIG. 1B. For example, a vertical solution may include a solution-specific backend system 320, a solution-specific application 322, and/or a first IoT device 324A. For example, the first IoT device 324A may communicate with the solution-specific backend system 320 and/or the solution-specific application 322 as part of the vertical solution. The IoT integration platform system 300 enables a second IoT device 324B to become connected, even though the second IoT device 324B is not part of the vertical solution. Collectively, the connected devices including the first and second IoT devices 324A and 324B may be referred to as "the IoT devices 324." The technology to implement such integration may be achieved via the integration backend system 302, an integration application 328, such as the integration interface 214 of FIG. 2, or both. In various embodiments, any one or more of the modules of the integration backend system 302 may be implemented within the integrated application 328.

For example, integration may be achieved in any combination of the following methods, including cloud-based integration, mobile-based integration, and device-based integration. The integration method may depend on the manufacture of each of the IoT devices 324. Regardless of the integration method, the integration backend system 302 and/or the integration application 328 are informed of the existence of any newly connected IoT device.

For cloud-based integration, the communication interface module 318 enables communication between or amongst the integration backend system 302 and one or more of the solution specific backend systems 320. For mobile-based integration, the integration application 328 may communicate with the solution-specific application 322. For example, this communication may be achieved by providing an integration SDK 326 to the solution-specific application 322 and/or the integration application 328. For device-based integration, the integration application 328 may communicate with the IoT devices 324 belonging to different vertical solutions via an open protocol. For example, the integration application 328 may scan different local networks (e.g., Wi-Fi, Bluetooth, BlueTooth Low Energy, Zigbee, etc.), identify the IoT devices 324, and connect to control interfaces of each of the IoT devices 324.

For example, the communication interface module 318 may include an agent for communicating with an API on the solution-specific backend system 320. Alternatively, the communication interface module 318 may include an API of its own, and may allow the solution-specific backend system 322 to send/retrieve data, including real-time data, context data, sensor data, sensor metadata, configuration data, or any combination thereof, through the API.

As another example, the integration SDK 326 can embed communication processes/protocols for communicating with the communication interface module 318 of the integration backend system 302 and/or the integrated application 328. In some embodiments, the integrated application 328 may be distributed from the integration backend system 302. For example, the IoT devices 324 that have Wi-Fi connectivity may become visible to the integration platform 300 when in the Wi-Fi networks where the integration application 328 is connected.

As yet another specific example, an IoT device 324, such as the second IoT device 324B may integrate directly with the integration backend system 302 and/or the integrated application 328. The second IoT device 324B may be configured such that the protocols and processes for communicating with the integration backend system 302 and/or the integrated application 328 are stored thereon. Optionally, a device integration SDK (not shown), similar to the integration SDK 326, may be configured within an IoT device 324. The integration device SDK may enable the IoT devices 324 to communicate with the integration backend system 302, the integrated application 328, and/or with each other (shown as a dotted line connection).

Device Identification

The device identification module 312 is configured to generate a unique ID for each IoT device detected by the integration platform 300. The unique ID enables tracking of the IoT devices for the purposes of authentication, data access permissions and security, data correlation, data analysis, rule generation, rule execution, event tracking, and/or user interface. In some embodiments, the device identification module 312 may also detect the type and/or make of the IoT devices. The type may define the data structure of the IoT device, actions that are applicable to IoT device, and/or communication protocols and processes of the IoT device. As a specific example, correlating device features of a smart home automation light switch enables the data consolidation modules to communicate with the light switch and the interoperable rule modules to control and manage the light switch. The device identification module 312 can simplify the connectivity process of adding a new device by identifying the new device completely or partially without user input.

Identifying virtually and physically connected devices around a user or a place relevant to the user is an important component for the interoperability function. For example, the device identification module 312 may employ at least one of the following methods to identify the IoT devices 324: (a) device based identification, where unique IoT device identifier may be created based on the device's data elements; (b) protocol based identification, where unique device identifier may be created based on a device communication element or elements; (c) device and protocol based identification, where a combination of device data and communication protocol data may define the device identification; (d) device behavior based identification, where the device is identified based on its predefined or observed behavior, or any combination thereof. Behavior can be, for example, audible, visual, magnetic, electronic, motion, or any combination thereof. Behavior pattern can be passive or responsive to a command or stimulus. The device identification module 312 may recognize an IoT device behavior based on IoT device data, a test and verification command, or a context event associated with the IoT device. The test and verification command, for example, may include the device identification module 312 sending a blinking command to a connected light bulb in order to identify the exact bulb of multiple bulbs around. In this manner, the recognition of a context (e.g., behavioral context) and/or semantic circumstance of the IoT device (e.g., the light bulb) can define the unique identifier of the IoT device.

Device identification can be based on image recognition. Image-recognition-based device identification may be assisted by relevant data including contextual parameters from the data correlation module 306, the data analysis module 308, or both. For example, if the device identification module 312 analyzes a device and determines that the device may be either be a Samsung™ fridge or a Samsung™ TV, the device identity may be determined based on its geo-location context (e.g., if the device is in living room, then the device is a TV, and if the device is in kitchen, then the device is a fridge). In this case, for example, location may be determined through radio frequency (RF) beacons of other devices around or through geo-locating components. In the example of RF beaconing, if a microwave and coffee machine are detected around the device, then the device is probably in the kitchen. Location may further be assisted by semantic data. For example, if the device is proximate (e.g., within a distance threshold) to a bulb named by the user as "kitchen light", then the device is in the kitchen. Proximity may be estimated by distance through router signal strength indication (RSSI) or visual recognition.

Data Consolidation

Figure 7:
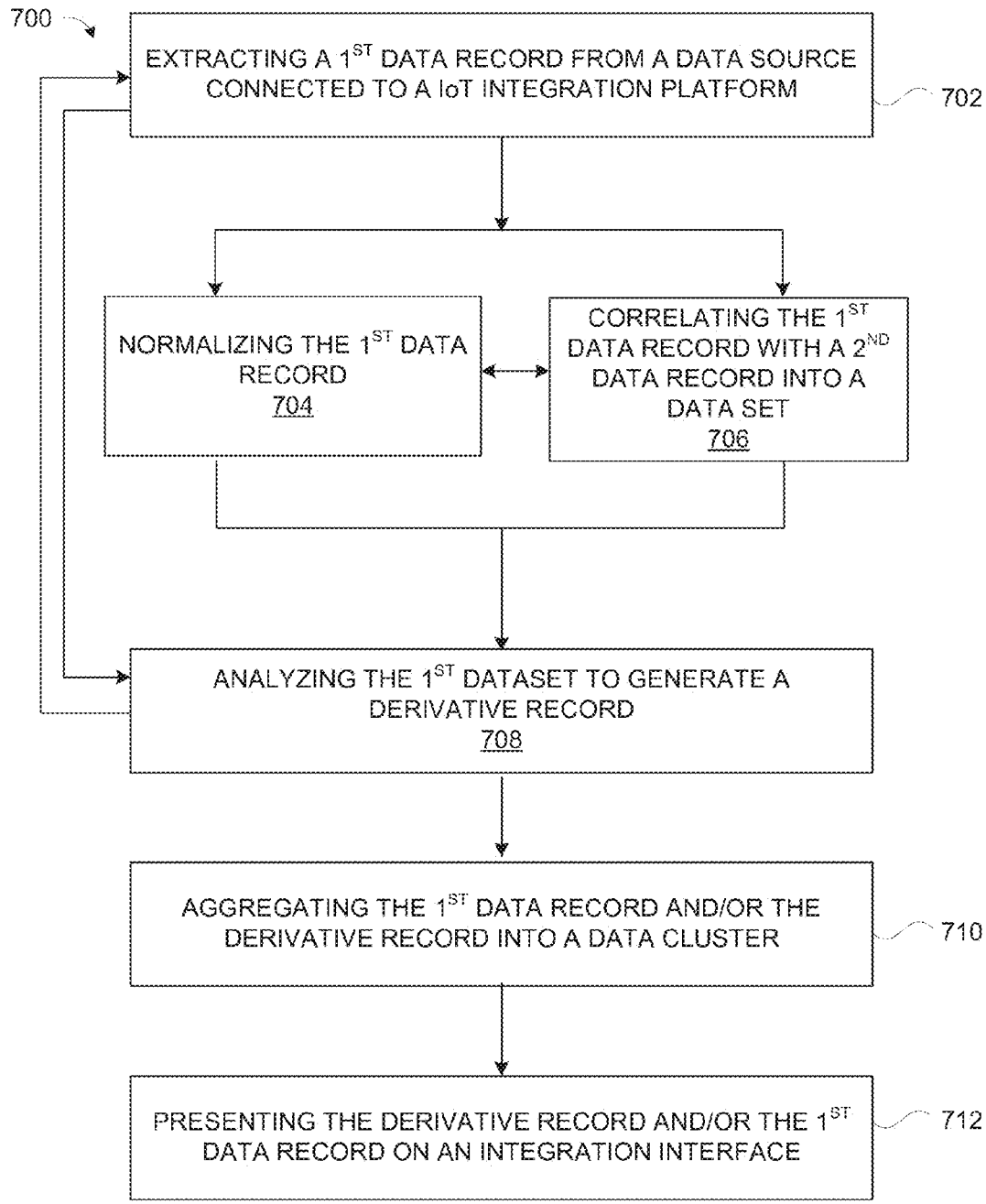
FIG. 7 is a flow diagram of a method of data consolidation, consistent with various embodiments of the disclosed technology.

The task of data consolidation may be divided into steps. For example, data consolidation may be performed in the following steps including: (1) data extraction, (2) data aggregation, (3) data normalization, (4) data correlation, (5) data analysis, and (6) data visualization. An example of the data consolidation flow is illustrated in FIG. 7. The integration backend system 302 and/or the integration application 328 may implement any combination of the steps for data consolidation. For example, when a user operates an activity tracker and a network scale, the integration platform 300 enables a consolidated interface to present a correlative view of the user's weight and activities in a meaningful manner to assist the user in monitoring his/her health. The combination of the above steps enables unique correlation features that have been discovered to be advantageous. The data consolidation steps enable contextual and semantic insights based on a multitude of sensor/measurement/semantic/analytical/user-reported/device status data, rather than just a listing of sensor data. For example, the data consolidation may provide the user with health related insights of himself (e.g., when the user goes to work using public transport, the user burns four times more calories than when driving a car to work). Thus, the data consolidation steps may be used to motivate the user to change habits and behavioral patterns that affect his/her fitness/health. The data correlation module 306 is configured to extract raw data from different sources, including the IoT devices 324. For example, the data correlation module 306 can receive data (e.g., real-time from continuous or discrete data stream, non-real-time data, device sensor data, user-device interaction dataset, user reporting dataset, or any combination thereof including metadata thereof) from the IoT devices 324. For example, the data may include measurements, user commands, or user-reported status updates. The data correlation module 306 may receive the datasets directly from the IoT devices or via reporting from the solution-specific application 222 or the integrated application 328.

The data correlation module 306 may further be configured to extract raw data from an external source. For example, the raw data may be extracted from an online or virtual data source, such as a geo-location map, a social network, a calendar, a media network, or any combination thereof.

The data correlation module 306 may yet further be configured to extract data based on data analysis, such as the data analysis performed by the data analysis module 308. Data analysis may include semantic analysis and context awareness analysis. Further description of data generated from the data analysis module 308 is described herein.

The data correlation module 306 may be configured to aggregate the datasets into meaningful data buckets during the process of data collection. As data is extracted, the data is organized into the meaningful buckets (e.g., cluster). The data aggregation may be based on a time line, based on user, based on device type, based on user-defined groups, based on location, or any combination thereof.

The data correlation module 306 may be configured to normalize each of the datasets. For example, data along the same dimension may be normalized across time periods, across the data buckets through aggregation, or a combination thereof.

The data correlation module 306 may also be configured to correlate portions of the datasets with each other. Data correlation is an intelligent way of associating a portion of the datasets with another portion of the datasets. The data correlation may be based on time synchronization, shared social relation (e.g., devices are owned by user accounts in the same social group), shared data dimension (e.g., both devices measures weight), shared data source profile (e.g., location or device-type, etc.), data owner profile (e.g., user profile or user configurations), shared known semantic (e.g., both devices are considered "kitchenware"), shared known context (e.g., both devices are operated in the context of exercising), or any combination thereof.

For example, the data reported from a networked heating system may be correlated with the data reported from a networked thermometer based on a shared data dimension and a shared data source location. As another example, aggregated data reported from an exercise tracker on a first user may be correlated with an aggregated dataset of heart rate data of the first user (i.e., because of shared known context of "user health"). The aggregated dataset of heart rate data may in turn then be correlated with an aggregated dataset of user reported calorie count from the first user (i.e., because of shared known context of "user health").

The data correlation module 306 is configured to interface with the data analysis module 308. The data analysis module 308 is configured to determine a set of semantic or context data from the correlated datasets. Note that part of the correlated datasets may include semantic or contextual data already.

Semantic

The data analysis module 308 may determine semantic meaning to each of the IoT devices 324 and the data processed by the data correlation module 306. Initially, the IoT devices 324 do not have any assigned meaning to an user. For example, the IoT devices 324 are devices like switches, routers, light bulbs, fridge, TV, car, etc. However, to users, the IoT devices 324 symbolize more than just a bulb. Users prefer to use devices based semantic meanings of the devices. For example, an "X-Box" switch, "my home" router, "kitchen" light, "bathroom" light, "my parents'" fridge, and "kitchen" TV are all potential semantic labels that may assist a user when operating a set of IoT devices 324. The semantic labels on the IoT devices 324 may also assist the data analysis module 308 to better understand the context of the user's intentions. For example, a "front door" may be in a context with different default behaviors or interoperable rules than a "bedroom door." Similarly, data generated through these semantically labeled IoT devices 324 may also be semantically labeled. The data analysis module 308 may implement semantic learning to each user's devices based at least one or more of the following methods:

User-based: Semantic meaning may be defined by a user. A user may submit through the client application interface 322 or the integration application 328 that a specific device is connected to another device. For example, the user may submit through the client interface that a switch is connected to a game console X-Box, and hence the switch may be labeled the "X-box switch."

Device-based: Semantic meaning may be determined via an adaptive correlation mechanism as implemented through the data correlation module 306 described above. Through network scanning techniques, the adaptive correlation mechanism may identify that the user's smartphone sees the specific light bulb always at the same time when a fridge is also identified. The adaptive correlation mechanism may learn that the light bulb has significant meaning together with the fridge. Such a correlation of data enables an understanding that the light bulb is very close to the fridge. The data analysis module 306 can then adopt an existing semantic meaning of the fridge being in the "kitchen" to the specific light bulb (i.e., labeling the light bulb as the "kitchen" light bulb).

Behavior profile based: The data analysis module 308 may profile user's behavioral patterns and identify places, devices and people that a user is connected to during his/her day. For example, when a user is connected to IoT devices always or highly frequently during working days from a specific router or a geo-location, then the data analysis module 308 may label the IoT devices with a semantic meaning of being a "work" device based on association the specific router or with a geolocation of work.

Context Awareness

Through semantic awareness and devices' interoperability, the data analysis module 308 may recognize the context between and/or amongst devices, people, places and time. Context may be organized semantically for ease of comprehension by the user of the integration platform. Context may work to approximate or describe a real-life situation, place, event, or people based on datasets collected from the IoT devices or other nodes (e.g., social network, external user-associated accounts, or geographical databases). Context may work to predict a future situation based on datasets collected from the IoT devices. Context may answer questions, such as who is doing what activity at when and where, and why is the activity being done. For example, the context of "mother is cooking dinner in the kitchen tonight" may be detected by activation of mother's cellphone near a networked oven that is also activated. Context awareness mechanisms of the data analysis module 308 may be derived through one or more of the following methods:

Behavior profile based: The data analysis module 308 may derive at a particular context through device behavior analysis. For example, "finished running", "child arrives home from school" awareness are recognized based on devices behaviors including when exercise tracker stopped registering movement or when a smart TV is tuned to a cartoon channel at home in the afternoon.

Socially-based: The data analysis module 308 may derive at a particular context through interaction with social graph data from a social network associated with a user account. For example, when users communicate to their friends via a social network, a matching mechanism can be applied to assign awareness of a friendship relationship to the devices of the user's friends. A semantic label of a "friend Erica's smart watch" may be assigned to a wearable device registered to a friend of the user named "Erica". Henceforth, any activity observed through the smart watch may have a social context to the user as an activity performed by the friend "Erica". As another example, when a device registered to "Erica" (e.g., the device is frequently or always with "Erica") is detected in the vicinity of the user's active region (e.g., where the data analysis module 308 has determined the user to be or location of a networked door of a registered home to the user), the data analysis module 308 may register a contextual event of "Erica is at the door."

Geo-location based: The data analysis module 308 may further identify geo-locations of multiple devices' activities to determine location context. In each network scanning event of a connected IoT device, a geolocation (longitude, latitude, accuracy) may be collected. Therefore, each IoT device and/or IoT device activity can have a geolocation history that defines the device's geolocation context. Geo-location, for example, may be reported via a global positioning system (GPS) component or a network module (e.g., via network source triangulation) of the IoT devices 324.

The data analysis module 308 may also determine the geo-location of an IoT device by generating and maintaining an in-door navigation map. Techniques, such as GPS geo-location and/or cellular network-based geo-location navigation systems, may not be as effective or readily available (e.g., due to low signal strength) while in-doors for positioning people and devices. In one embodiment, an in-door geo-location solution may include special hardware systems that are placed inside the building for indoor geo-location and navigation.

A preferred solution may include geo-location via local network connections without additional special hardware systems. In various embodiments, a directory of connected devices that belong to the user may be kept in a database store coupled to the data analysis module 308. The directory along with beacon signal from Bluetooth or WiFi may be used to estimate the position of a user indoors. For example, for each Wi-Fi network router scanning, the GPS geolocation and RSSI may both be collected through the data correlation module 306 or the data analysis module 308. The RSSI enables the data analysis module 308 to position local networking devices (e.g., routers, access points, or switches) relatively to each other in every specific geo-location point. Each IoT devices connected to the indoor network (e.g., Wi-Fi) through its visibility position relative to the local networking devices in every moment may thus enable locating of the user and IoT device activities in-house.

The data analysis module 308 may calculate the set of context in real-time as data is reported from the IoT devices. Absolute and/or relative timing of IoT device data may be used for temporal context. For example, the data correlation module 306 may correlate IoT device activation times from IoT devices in the same room. The data analysis module 308 can then compute a user relevant context from the device activation times. For example, if the IoT device activation times are close to one another within a predetermined time period in the morning, the data analysis module 308 may record a "user has woken up" context. As another example, if IoT device disconnection times for IoT devices within the same room are simultaneous within a very close margin, the data analysis module 308 may record a "blackout" context. This "blackout" context may be differentiated from when the IoT device disconnection times are sequential instead of simultaneous. As yet another example, a sequential turning off of IoT devices may signal a "user getting ready to sleep" context or "user leaving home" context.

Correlative Insights

Figure 10A:
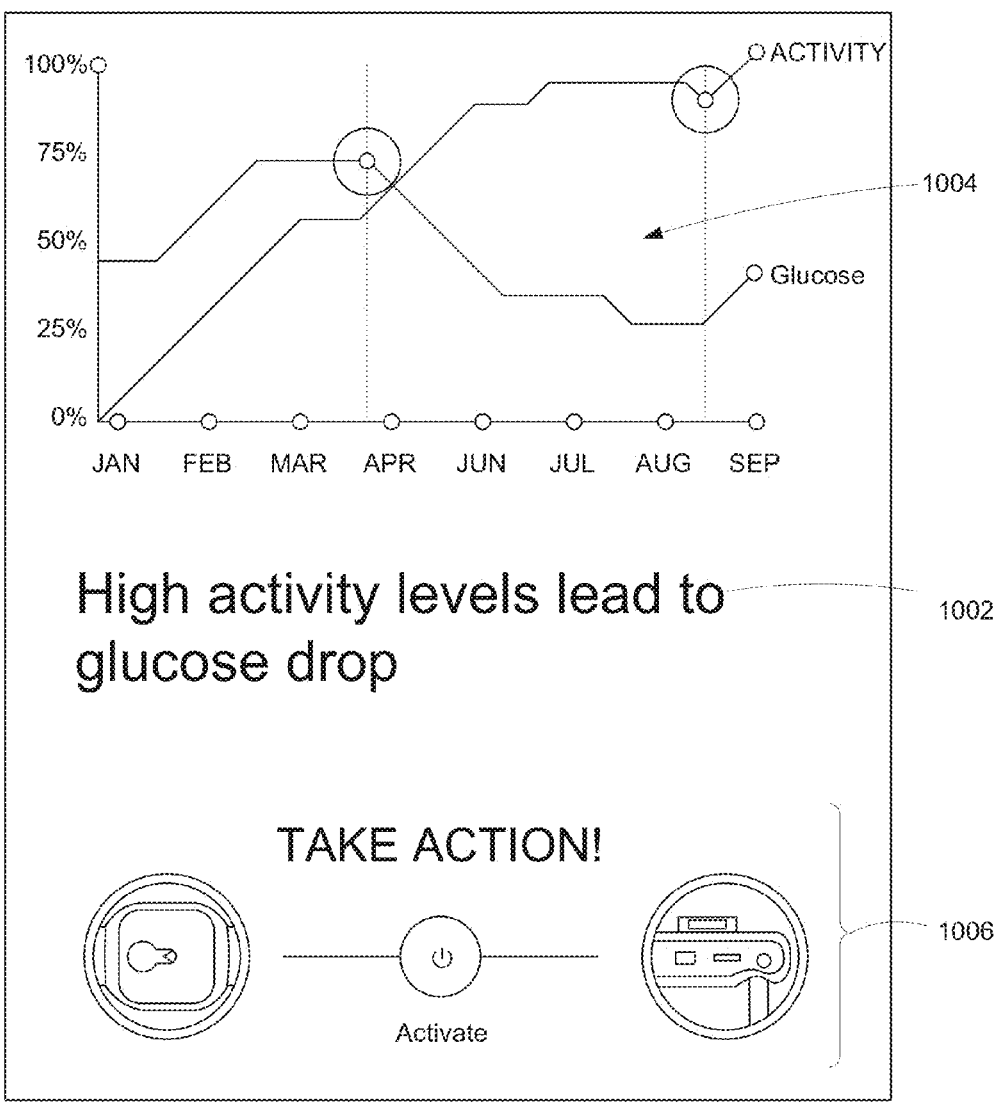
FIG. 10A is an exemplary screen shot illustrating the consolidation interface showing a correlative insight, consistent with various embodiments of the disclosed technology.
Figure 10B:
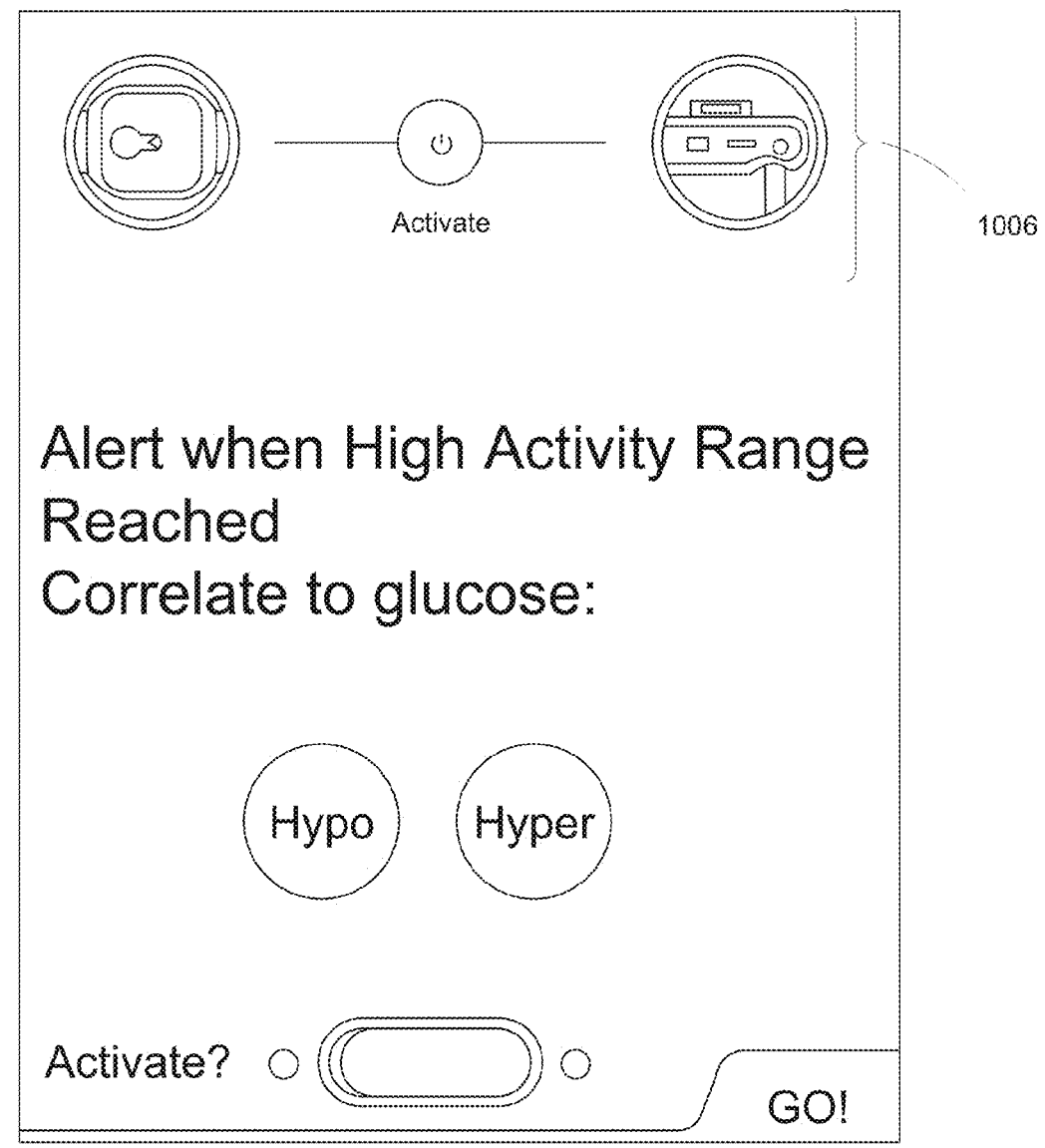
FIG. 10B is an exemplary screen shot illustrating the consolidation interface generating an interoperable rule from the correlative insight, consistent with various embodiments of the disclosed technology.

Correlative insights may also be determined by the data analysis module 308. The correlative insights are actionable insights for facilitating the user to make decisions regarding what action(s) to take. FIGS. 10A-10B illustrate examples of how the correlative insights may be shown on a consolidated interface generated by the consolidation interface generator module 304. For example, the data correlation module 306 may be able to collect a first data set of glucose level data from a wearable device of a user. The data correlation module 306 may also be able to collect a second data set of activity level data from another wearable device of the user. The data correlation module 306 may then correlate the two datasets. The data analysis module 308 may determine a correlative insight that "high activity level leads to sudden drop in glucose level." This correlative insight may then be used to generate interoperable rules to notify the user to stop exercising after a certain activity level is reached in order to avoid sudden drops in glucose level.

The consolidation interface generator 304 is configured to provide a consolidation interface to access and/or manage IoT devices connected to the integration platform 300. The consolidation interface generator 304 enables consolidation of connected devices for a consumer/user to a single client interface. The single client interface may be presented on the integration application 328 or any other network device capable of accessing the web and connect with the integration backend system 302. The consolidation interface generator 304 may also be configured to provide access to real-time or non-real-time data captured by one or more of the IoT devices.

Figure 4:
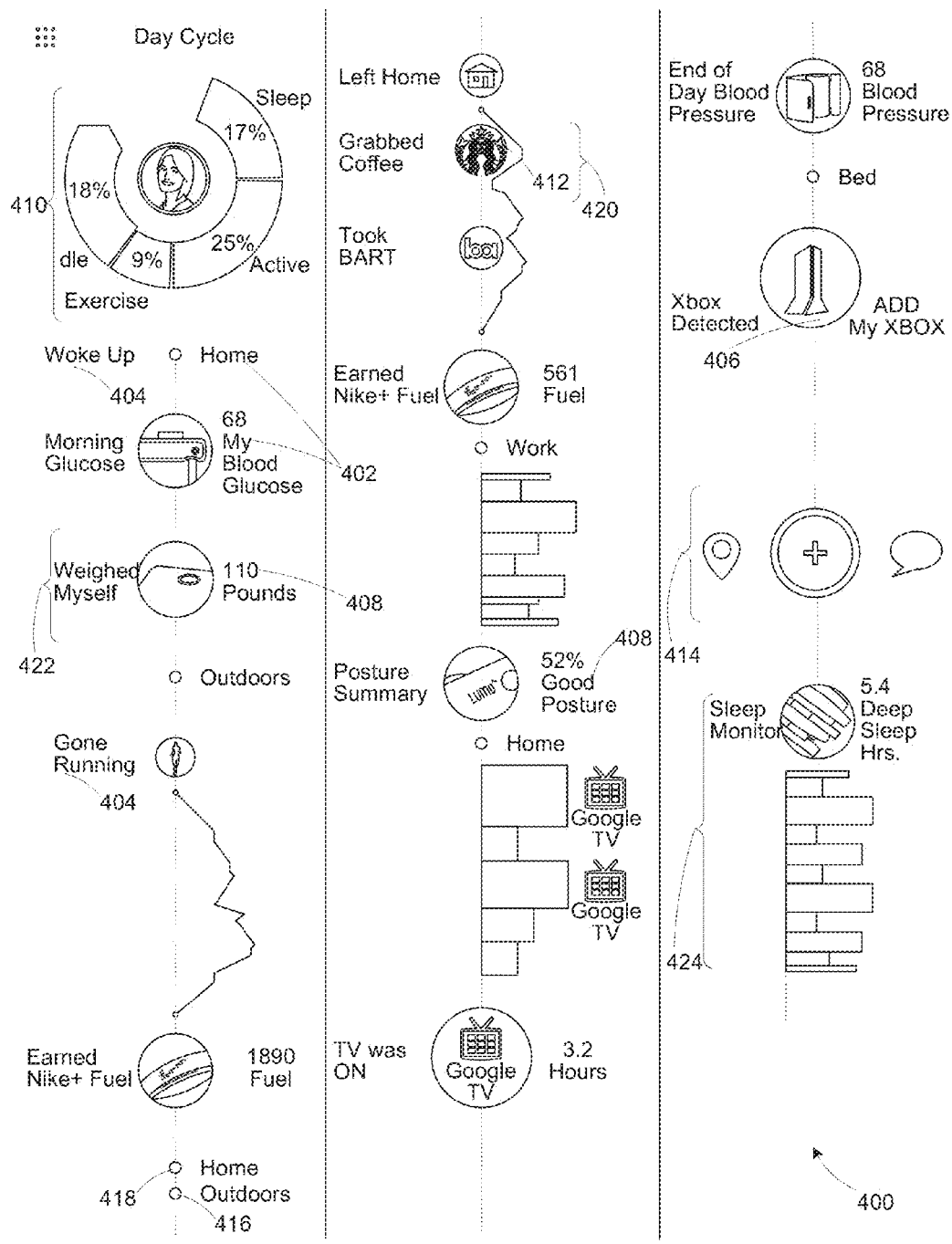
FIG. 4 is an example of an user interface illustrating an active lifeline diagram for a user account on an integration interface, consistent with various embodiments of the disclosed technology

As an specific example, the data correlation module 306 may aggregate data to generate a "life line" to be presented through the client interface generated by the consolidation interface. The "life-line" may serve as an automated diary related to a user as illustrated in FIG. 4. A users' daily activities and events may all or partially be correlated together in the order of the time of the day.

The "life line" may include context events determined by the data analysis module 308 as well as data from the IoT devices. The "life line" may be accessible to the user and/or social connections (e.g., friends in a social network) of the user through the consolidation interface. The "life line" may provide a big picture view for the user to visualize relevant correlated datasets related to him/herself. The "life line" may tag IoT device data in a timeline automatically based on a context-relevancy determination by the data analysis module 308 or based on user interaction. The "life line" may also be a motivator for collection of semantic data from a user. For example, when a user spent a considerable large amount of time in a place, the data correlation module 306 can collect and correlate data associated with a default name "place in Menlo park." The user may then be motivated to correct the semantic label to "home."

For example, users may be able to see a life log with places the user has been, activity tracking data, health statuses, calendar events, weather data—all data correlated together over the timeline of the day. Additionally, the user may be able to add his/her custom events on the "life line". The "life-line" is thus user specific. The accessibility and/or configurability of the "life-line" may be secured via privacy settings per user. Data (e.g., measurements, commands, status updates, and etc.) coming from the IoT devices 324 may be aggregated, analyzed, and/or correlated via the data correlation module 306 and/or the data analysis module 308. An advantage of the data analysis and data correlation is generation of one or more layers of contextual, correlative, and/or semantic insights, trigger events, and/or actions. The data analysis module 308 may apply machine learning on the analyzed and/or correlated data coming from the three layers described above and create a sense of "cognition"— understanding of contextual, correlative, and/or semantic events in a user's life. These layers enable predictive or reflective comprehension of user and/or IoT device behavior patterns and/or trends, and may further enable synthesis of generalizations of user and/or IoT device activity or need.

Detection of contextual events may be useful as evident below for the purposes of generating and executing interoperable IoT device rules, such as for the use by the rule generation module 310, the rule execution module 314, and the event track module 316. For example, when the friend's (e.g., Erica's) activity tracker is close to the connected door lock of the user, and the user has given permissions, then the connected door lock can open automatically by recognition of a social context of a "friend at my home next to my connected door."

Interoperability—Rule Generation and Execution

It has been discovered that interoperability is a significant part of consolidation of vertical solutions for IoT devices. Interoperability functions may be implemented through the rule generation module, the device identification module 312, the rule execution module 314, and/or the event track module 316. Interoperability enables creation of logical connections between the connected IoT devices. For example, when a user turns off his office lights and leaves the work, then his home temperature may be set automatically for a desired temperature. The logical connections between the connected IoT devices may be created through users' natural languages. For example, a logical IoT devices rule may be implemented through a natural language indication by "when I leave home, turn off my lights and start my Roomba vacuum cleaner" or "when I finish exercising, then cool down my car".

Once a logical connection is defined, the logical connection can take place based on defined interoperable rules without any user interference. The interoperability functions may be based on a trigger-action mechanism responsible for creating (e.g., the rule generation module 310), storing (e.g., the rule generation module 310), validating (e.g., the rule generation module 310), tracking (e.g., event tracking module 316), and activating (e.g., the rule execution module 314) the interoperable rules. For example, the rule generation 310 may create, store, and confirm a context event based rule with the user. The event track monitor 316 may, for example in substantially real-time or periodically, recognize context triggered conditions (e.g., "I left home"; "finished exercising", or "Erica entered to the kitchen"). The rule execution module 314 may then execute the context event based rule when the context triggered condition is satisfied.

As an example, the rule generation module 310 may have created a context-based rule of "if user left the house then turn off all in-house devices." The event track module 316 through the data analysis module 308 may be able to detect in real-time that a "user has left the house" context at time point $T_1$. Thus in response to the detection of the conditional event at time $T_1$, the rule execution module 314 may execute multiple shutdown commands to multiple IoT devices at the user's home address.

As another example, an interoperable rule may be an authentication condition coupled to unlocking of a connected security device (e.g., a network enabled door). The authentication condition, for example, may be a contextual event of "a friend coming over to my house." The event track module 316 may detect this contextual event when a friend's activity tracker device nears the connected door of the user. In this example, the geo-location of the connected activity tracker or other wearable devices of the friend can be used as the basis of confirming the authentication condition. The authentication condition may include multiple other factors, including geo-location proximity of a second and/or a third device belonging to the user or the user's friend, including smartphones or mobile devices. The rule generation module 310 is configured to facilitate creation of rules to control the IoT devices. The rule generation module 310 may couple to a rule management interface. The rule management interface may be part of the consolidation interface generated by the consolidation interface generation module 304. The rule management interface may be part of the consolidation interface generated by the consolidation interface generator 304. Rules may be configured by a user or automatically determined by the rule generation module 310. When a rule is determined by the rule generation module 310, the rule is shown as a recommendation. The recommendation is then suggested through the consolidation interface for validation by the user. The rules may be stored on the integration backend system 302 or on an IoT device associated with a user who created or validated the rule.

The rules may include conditionals based on events, context, user trigger, time trigger, or any combination thereof. The rule generation module 310 may be coupled a rule management interface that enables selection(s) of a conditional followed by selection(s) of a command. A rule recommendation may be determined by an adaptive learning mechanism, such as by user behavior pattern (e.g., every morning the user turns on the air conditioning to 70 degrees), by user-profiling (e.g., other users of the same age and/or gender prefer to have a health report aggregated from health-related IoT devices and therefore a rule to generate a health report is created), or by social triggers (e.g., a friend who owns a Tesla decides to send over his IoT device rules associated with owning a Tesla).

A user is able to define the interoperability between his IoT devices according to his will, preference, habits, and/or desire of automation or any other type of motivation. Based on users' behaviors and users' profiling, the adaptive learning mechanism may recognize user's behavioral routine patterns and offer to a user to add an interoperable logical connection (i.e., IoT interoperable rule) between his/her connected devices. For example, the data correlation module 306 and the data analysis module 308 can recognize that every morning a user starts the coffee machine, turns on the music, leaves a house, and turns off all lights and thermostat. This sequence of IoT device commands to the coffee machine and the music player may be a recommended rule triggered by a context event of the user waking. The IoT device commands to the thermostat and the lights may be triggered by the context event of the user leaving the house. Users may also recommend the interoperable logical rules to their friends through any communication channel, e.g., social networks, emails, cellular messages, instant messages, or any combination thereof.

The event track module 316 is configured to synchronize execution of rules based on events. When the interoperable IoT rules are generated, execution of the rules may be based on a variety of conditional events. For example, the conditional events may include context-based events, device-state-based events, absolute or relative time-based events, socially triggered events, user profile triggered events, user behavior/interaction triggered events, or any sequential or parallel combination thereof. The event track module 316 may interface with the data analysis module 308 to detect the context-based events and execute context-based rules generated by the rule generation module 310. The event track module 316 may detect conditional events in the connected IoT devices 324 based on polling the connected IoT devices 324, or based on interrupts received from the IoT devices 324, the solution specific application 322, and/or the integration application 328.

In various embodiments, the event monitoring mechanism of the event track module 316 may be implemented on the integration application 328, the integration backend system 302, the IoT devices 324, or a combination thereof. When some logic of the event track module 316 is implemented on the IoT devices 324 or the integration application 328, the event track module 316 may be able to detect condition events based on interrupts instead of polling.

The implementation of the interoperable rule validation, tracking and execution may be distributed. For example, the implementation of the interoperable rules may be based on a distributed mesh model in communication with a central cloud service system (e.g., the integration backend system 302). In various embodiments, every user running the integration application 328 can validate, track, and execute interoperable rules, even if the interoperable rules do not belong to the user. For example, if a user lost a Bluetooth tagged keychain, the integration platform 300 may try to scan proximal environments of other users' devices for the user's keychain. Identifiers from the other users' devices may remain anonymous and/or encrypted for privacy reasons. The final location of the keychain is also shielded from access by the other users even if the other users' devices contributed to the locating of the keychain. An anonymized identifier may then be transferred to the integration backend server 302 to inform the user that the key chain is found.

The rule execution module 314 is configured to execute an interoperability logical rule through the IoT devices 324, the integration backend system 302, the integration application 328, the solution-specific applications 322, the device-specific backend systems 320, or any combination thereof. The rule execution module 314 may be configured to communicate with the above systems through the communication interface 318 to enable communication between all of the above devices, applications, and systems. The rule execution module 314 may also synchronize execution of commands related to multiple IoT devices. In various embodiments, similar to tracking of the trigger conditions, the execution of commands may also be distributed, including via devices owned by a user who is not the owner of the interoperable rule. In various embodiments, each user who owns devices may enable permission settings that allow other users to use the owned devices for tracking or execution of interoperable rules.

Environment Profiling

An important part of interoperability and data analysis is environment profiling. When creating interoperable rules, people/users are interested in conditional triggers and commands in a contextual and semantic basis and not machine observations and executions. Hence, the data analysis portion of the IoT integration platform system 300 is essential when interfacing with people. However, to perform these contextual, semantic, and correlative analysis dynamically each time may be ineffective. Hence, the environment profiler module 317 enables the IoT integration platform system 300 to generate a node graph that represents a physical environment, where each node represents an entity profile of a real-world thing (e.g., person, place, object, group, event, or other physical entity). The data analysis performed on each of these nodes is then stored on the entity profile to facilitate a contextual, semantic, and correlative understanding of the things or entities most relevant to the users.

Users can collaborative update the node graph, each creating his/her own perspective of the entity profiles of the nodes. Commands can be made to the IoT integration platform system 300 to interact with the entities without actual understanding of where and how the commands are to be executed. For example, a command of "secure my home" may include machine activations of IoT security devices including a connected door lock, networked cameras, and networked thief alert system. Such command is enable because the node "my home" may include a connection to a "security gadget group" which in turn includes the connected door lock, cameras, and thief alert system.

Blocks, components, and/or modules associated with the IoT integration platform system 300 may be implemented as hardware modules, software modules, or any combination thereof. For example, the modules described can be software modules implemented as instructions on a tangible storage memory capable of being executed by a processor or a controller on a machine. The tangible storage memory may be a volatile or a non-volatile memory. In some embodiments, the volatile memory may be considered "non-transitory" in the sense that it is not a transitory signal. Software modules may be operable when executed by a processor or other computing device, e.g., a single board chip, a field programmable field array, a network capable computing device, a virtual machine terminal device, a cloud-based computing terminal device, or any combination thereof.

Each of the modules may operate individually and independently of other modules. Some or all of the modules may be executed on the same host device or on separate devices. The separate devices can be coupled via a communication module to coordinate its operations. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The IoT integration platform system 300 may include additional, fewer, or different modules for various applications.

FIG. 4 is an example of an user interface illustrating an active lifeline diagram 400 for a user account on an integration interface, such as the integration interface 114 of FIG. 1 or the integration application 328 of FIG. 3, consistent with various embodiments of the disclosed technology. The active lifeline diagram 400, for example, may be part of the consolidation interface generated by the consolidation interface generator 304 of FIG. 3. The active lifeline diagram 400 may be accessible through the integration application 328.

As shown, the active lifeline diagram 400 illustrates a single day of a user, organized by when the user woke up to when the user went to sleep. Although the active lifeline diagram 400 has been illustrated for a time period of a single day, the user may define the length of the history data to any time period. In various embodiments, the user may scroll back between consecutive time periods along the life diagram 400. The active lifeline diagram 400 includes illustrations of semantic labels 402, contextual events/activities 404, icons of relevant IoT devices 406, relevant IoT device data 408, correlated contextual data 410, and externally sourced data 412, such as data source from a social network status report.

As a specific example, the correlated contextual data 410 may represent a user interface element on the top of the lifeline diagram 400 that enables tagging of activities or postings specific to fitness activity contextual labels (e.g., sleep, idle, active, and exercise). As another example, the icon of the relevant IoT device 406 is illustrated along with a contextual event that a new device and a new semantic label has been added for "My XBOX."

The active lifeline diagram 400 may respond and visualize correlative insights according to periodic or real-time data, or context updates, enabling users of the active lifeline diagram 400 to take action based on the insights. The active lifeline diagram 400 may also enable a user to tag or post his/her own updates as part of a life-logging mechanism. An example of a semantic camera interface to facilitate the life logging is illustrated in FIGS. 11A-11D. For example, the active lifeline diagram 400 may be advantageous in achieving a health action plan with live feedback information. This is a significant step-up from a mere lifestyle blog. The active lifeline diagram 400 may not only consolidate lifestyle and daily routine data (e.g., exercise and performance data) relating to fitness activities, but may also correlate a user's lifestyle habits and daily routine with a context of how healthy the user is based on numerous measurements and reports.

Elements of the lifeline diagram 400 may be divided into at least the following categories: life logging posts 414, type A elements 416, type B elements 418, type C elements 420, type D elements 422, type E elements 424, or any combination thereof. A life log post 414 is a user reported post or tag on the lifeline diagram 400. For example, the life logging posts may follow the following rules. A "+" sign may appear at the top of the lifeline when there is no other activity, on idle time, or when there is no other notification, element, or correlation within the same time period. When the plus sign is tapped, the posting options may appear. When choosing the post option, the plus sign may change to a camera icon enabling the semantic camera interface described in FIGS. 11A-11D. An editable text may appear on the left of the plus sign, such as "what is on your mind?" to request the user to specify an activity or a topic, or "what is this place?" to request the user to specify a location. If the user is idle and does not edit or take a photo for more than a threshold number of seconds, such as three seconds, then the post becomes a C type element 420, and the plus sign re-appears.

A type A element 416 is an activity or event where the place and description text is a predefined by the integration platform 300. However, a user may edit the text of the type A element 416 (e.g., by tapping once). The edited text may be returned to the integration platform 300, such as the integration backend system 302 for future rendering of the life line diagram 400. A type B element 418 is a node on the life line diagram 400. The node image may be defined by the integration platform 300, where the images may be cached off-line. The description text may be predefined by the server and editable by the user similar to the type A element 416. Again, the edited text may be returned to the integration platform 300.

A type C element 420 is a node on the lifeline diagram 400, where the node is represented by an iconic image. The default iconic image may be received from the integration backend system 302. However, the user may tap the iconic image to take and upload a picture to the integration backend system 302. A type D element 422 is a node on the lifeline diagram 400, where the node is associated with an activity, a contextual icon, and a display of data. A type E element 424 is a node on the lifeline diagram 400, where the node is a data representation diagram. The user may configure how the data come from the integration backend system 302. The user may also configure how the data is represented in the data representation diagram.

Figure 5:
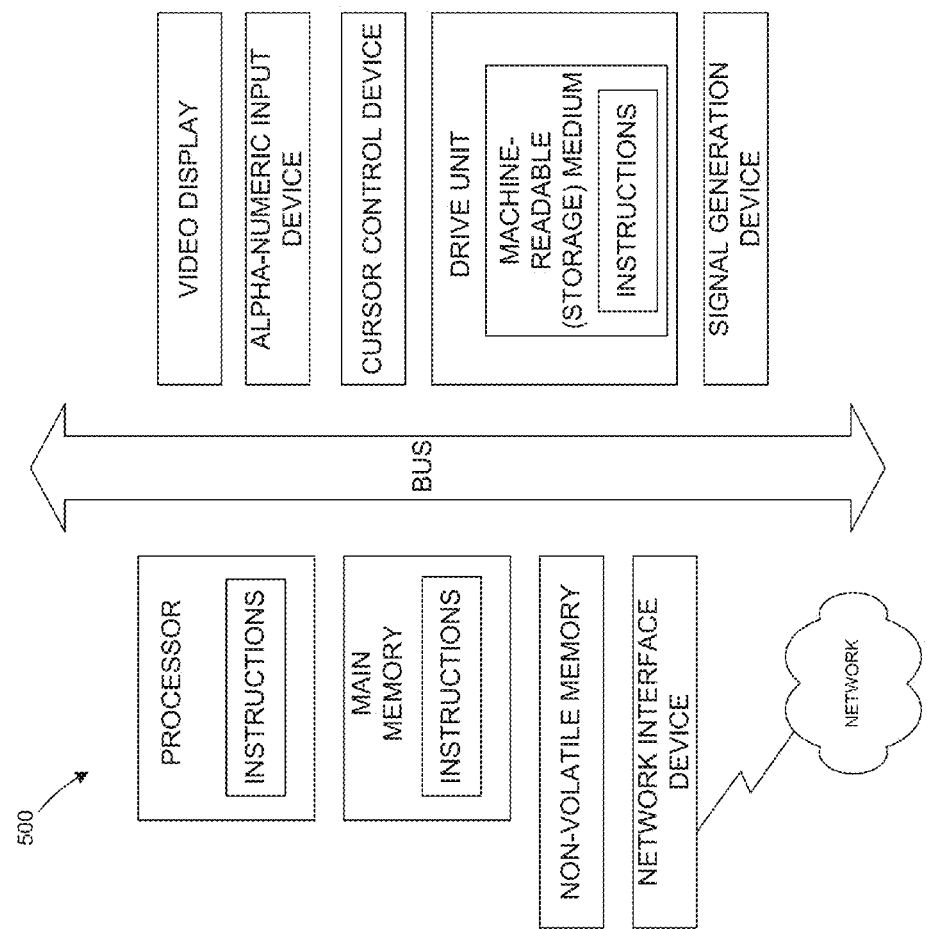
FIG. 5 is a diagrammatic representation of a machine in the example form of a computer system within which a set of instructions, for causing the machine to perform any one or more of the methodologies or modules discussed herein, may be executed.

Referring now to FIG. 5, therein is shown a diagrammatic representation of a machine in the example form of a computer system 500 within which a set of instructions, for causing the machine to perform any one or more of the methodologies or modules discussed herein, may be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the modules or components depicted in the example of FIG. 2 or FIG. 3 (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer system 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Figure 6:
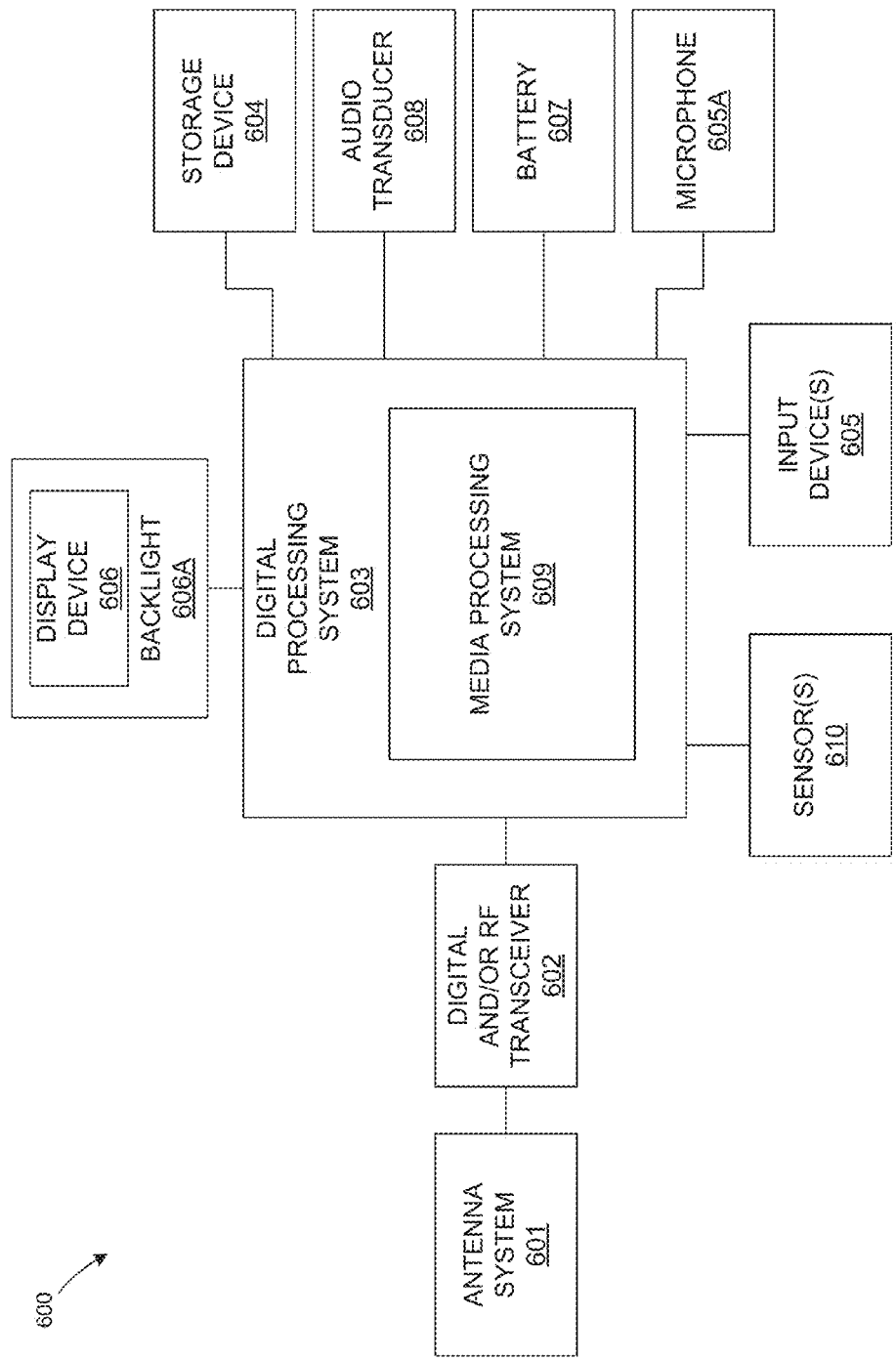
FIG. 6 is a diagrammatic representation of a wireless device.

FIG. 6 shows an embodiment of a wireless device 600 which includes the capability for wireless communication. The wireless device 600 may be included in any one of the devices shown in FIG. 2, although alternative embodiments of those devices may include more or fewer components than the wireless device 600.

Wireless device 600 may include an antenna system 401. Wireless device 600 may also include a digital and/or analog radio frequency (RF) transceiver 602, coupled to the antenna system 601, to transmit and/or receive voice, digital data and/or media signals through antenna system 601.

Wireless device 600 may also include a digital processing system 603 to control the digital RF transceiver and to manage the voice, digital data and/or media signals. Digital processing system 603 may be a general purpose processing device, such as a microprocessor or controller for example. Digital processing system 603 may also be a special purpose processing device, such as an ASIC (application specific integrated circuit), FPGA (field-programmable gate array) or DSP (digital signal processor). Digital processing system 603 may also include other devices, as are known in the art, to interface with other components of wireless device 600. For example, digital processing system 603 may include analog-to-digital and digital-to-analog converters to interface with other components of wireless device 600. Digital processing system 603 may include a media processing system 609, which may also include a general purpose or special purpose processing device to manage media, such as files of audio data.

Wireless device 600 may also include a storage device 604, coupled to the digital processing system, to store data and/or operating programs for the wireless device 600. Storage device 604 may be, for example, any type of solid-state or magnetic memory device.

Wireless device 600 may also include one or more input devices 605, coupled to the digital processing system 603, to accept user inputs (e.g., telephone numbers, names, addresses, media selections, etc.). Input device 605 may be, for example, one or more of a keypad, a touchpad, a touch screen, a pointing device in combination with a display device or similar input device.

Wireless device 600 may also include at least one display device 606, coupled to the digital processing system 603, to display information such as messages, telephone call information, contact information, pictures, movies and/or titles or other indicators of media being selected via the input device 605. Display device 606 may be, for example, an LCD display device. In one embodiment, display device 606 and input device 605 may be integrated together in the same device (e.g., a touch screen LCD such as a multi-touch input panel which is integrated with a display device, such as an LCD display device). The display device 606 may include a backlight 606A to illuminate the display device 606 under certain circumstances. It will be appreciated that the Wireless device 600 may include multiple displays.

Wireless device 600 may also include a battery 607 to supply operating power to components of the system including digital RF transceiver 602, digital processing system 603, storage device 604, input device 605, microphone 605A, audio transducer 608, media processing system 609, sensor(s) 610, and display device 606. Battery 607 may be, for example, a rechargeable or non-rechargeable lithium or nickel metal hydride battery. Wireless device 600 may also include audio transducers 608, which may include one or more speakers, and at least one microphone 605A. In certain embodiments of the present disclosure, the wireless device 600 can be used to implement at least some of the methods discussed in the present disclosure.

FIG. 7 is a flow diagram of a method 700 of data consolidation, consistent with various embodiments of the disclosed technology. The method 700 includes extracting a first data record (e.g., a data entry, measurement, stream, etc.) from a data source connected to an IoT integration platform, such as the IoT integration platform 200 of FIG. 2 or the integration platform 300 of FIG. 3, at a step 702. The data source may be an external data source, data reported from one or more IoT devices, or analyzed and/or correlated data based on the above, such as contextual data, correlations, semantic data, or other metadata. The step 702 may include determining an unique identifier of a first IoT device, where the first IoT device is the data source. The step 702 may be performed by the data correlation module 306 of FIG. 3.

Optionally data records may be normalized. For example, the first data record may be normalized with respect to other data record along a same data dimension at step 704. The step 704 may be performed by the data correlation module 306 as well.

Part of the data consolidation also includes correlating the data records and analyzing the data records to determine semantic label, context, and/or relevancy. For example, the data correlation module 306 may correlate the first data record with a second data record into a data set at a step 708. The data correlation may be based on a shared data dimension, a shared data context, a shared data source, a shared relevancy topic, a shared data semantic label, or any combination thereof. Optionally, the step 704 and the step 706 may be skipped prior to the data correlation.

The data analysis module 708 may analyze the first data record to generate a derivative record relevant to a user context at a step 708. The data analysis at the step 708 may be performed on the correlated data records in the data set generated at the step 706. Alternatively, the data analysis may also be performed directly on the extracted first data record and/or the normalized first data record of the steps 702 and 704, respectively.

The derivative record may include determination of a context of an IoT device activity. The derivative record may include determination of a semantic label for an IoT device associated with the first data record. The derivative record may include other predictive, trending, and/or comparative analytics. The derivative record may be used in another instance of the data consolidation flow as the extracted data record, such as in the step 702. The derivative record may be formatted as a natural language statement in any number of languages, such as the user's natural language.

After the above steps, different data records and data sets may be aggregated into a data cluster for a particular contextual relevant grouping, such as aggregating the first data record into a data cluster at step 710. The derivative record may also be aggregated into the data cluster. The data cluster may represent an aggregation of data that is beyond correlated. For example, a heart rate monitor data record may be correlated at the step 706 with a glucose level monitor data record because of a shared semantic and context of health related data. However, these health related data may be aggregated into a data cluster for other non-health-related activities on the same day because the relevant grouping of the data cluster pertains to the activities of the day.

After the above steps of data processing, the derivative record and/or the first data record is presented (e.g., visualized or audibly presented) on an integration interface for the user at a step 712. The first data record and/or the derivative record may be presented on the integration interface along with other data sets or data records of the data cluster. The context indication may be determined based on the derivative record from the step 714. The visualization may also include comparative visualization, semantic visualization, or topical visualization (e.g., based on topical relevancy). The visualization may present the first data record within the aggregated data cluster. The visualization may present the first data record after the first data record is normalized. The visualization may present the first data record and the correlated second data record simultaneously together for illustrating the shared data category or the shared context, such as the context from the context indication.

Figure 8:
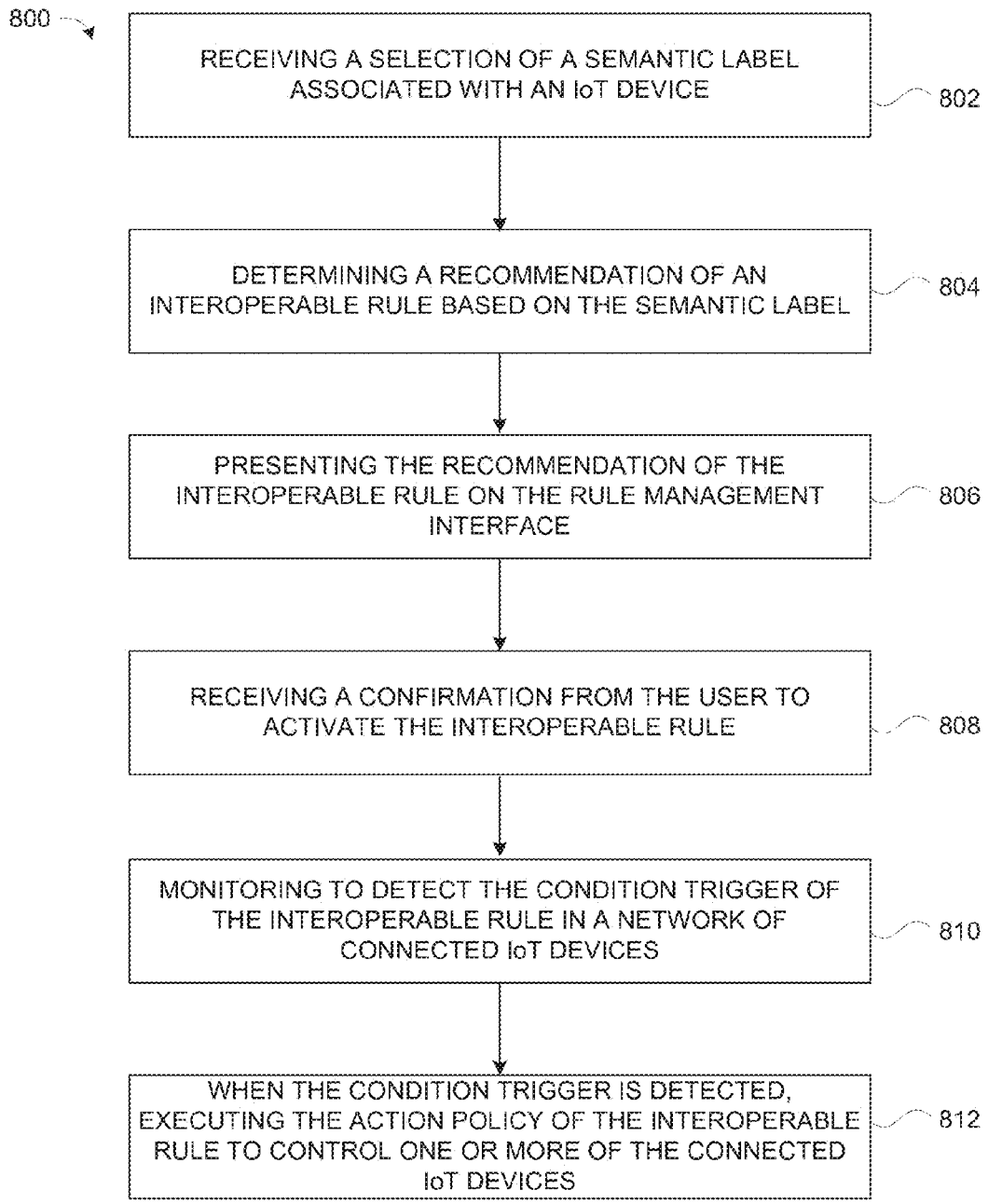
FIG. 8 is a flow diagram of a method of interoperable IoT rule management, consistent with various embodiments of the disclosed technology.

FIG. 8 is a flow diagram of a method 800 of interoperable IoT rule management, consistent with various embodiments of the disclosed technology. The method 800 includes receiving a selection of a semantic label associated with an IoT device from a user at step 802. The step 802 may be implemented by the rule generation module 310 of FIG. 3 through correspondence with a rule management interface. The semantic label may be generated from the data analysis module 308 of FIG. 3. Several semantic labels may be presented on the rule management interface, such as via the integration application 328 of FIG. 3 or the rule management interface illustrated in FIGS. 9A-9C. In various embodiments, the semantic label may be associated with more than one IoT devices.

The rule generation module 310 may determine a recommendation of an interoperable rule based on the semantic label in a step 804. Each interoperable rule may include a contextual condition trigger and an action policy to be executed when the contextual condition trigger is detected. The recommendation of the interoperable rule may be determined based on the selected semantic label, available context, and/or data dimensions from the IoT device associated with the semantic label. The interoperable rule recommendation may be determined based on a history of user behavior in operating IoT devices. The interoperable rule recommendation may be based on a previously configured interoperable rule by the user. The interoperable rule recommendation may be determined based on previously configured interoperable rules by other users of a similar user profile (e.g., age, gender, hobby, profession, or other demographic profile) as the user. The interoperable rule recommendation may be determined based on socially recommended interoperable rules by another user who is associated with the user via a social connection.

In response to receiving the selection, rule generation module 310 may present the recommendation of the interoperable rule on the rule management interface in a step 806. At a step 808, the rule management interface may receive a confirmation from the user to activate the interoperable rule.

In response to activation of the interoperable rule, the event track module 216 may monitor to detect the condition trigger of the interoperable rule in a network of connected IoT devices in a step 810. The condition trigger may include a contextual determination, a data pattern, or a state of the IoT device associated with the selected semantic label. When the condition trigger is detected, the rule execution module 314 may execute the action policy of the interoperable rule to control one or more of the connected IoT devices in a step 812. The one or more of the connected IoT devices to be controlled by the action policy may include the IoT device associated with the selected semantic label.

Figure 9A:
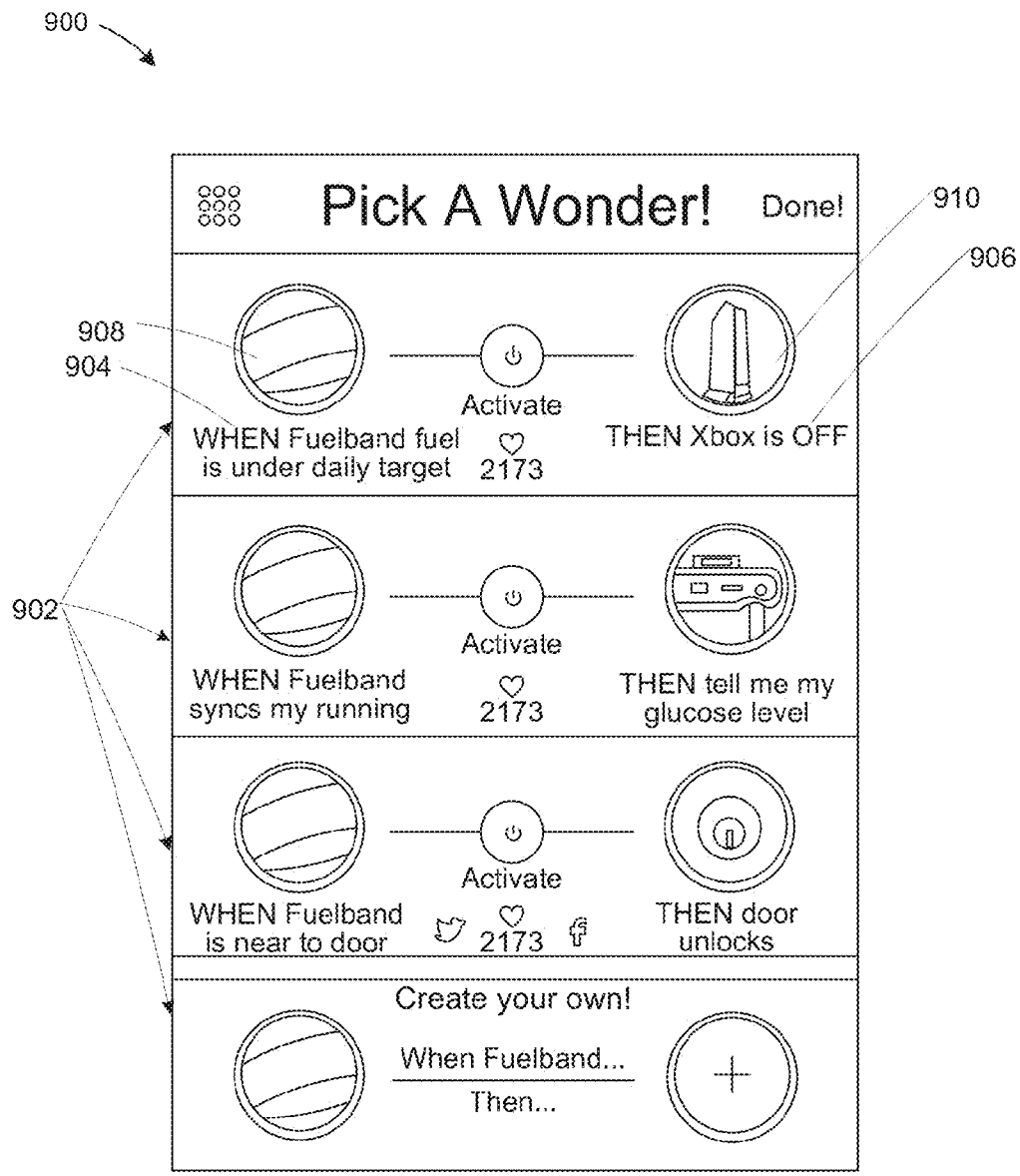
FIG. 9A is an exemplary screen shot illustrating a rule management interface of an integration platform at a rule activation stage, consistent with various embodiments of the disclosed technology.

FIG. 9A is a screen shot of a rule management interface 900 of an integration platform at a rule activation stage, consistent with various embodiments of the disclosed technology. FIG. 9A illustrates a list of interoperable rules 902, each with a condition trigger 904 linked to an action policy 906. Each condition trigger 904 may be described with respect to the semantic label and context of the IoT device involved for the condition trigger 904. A monitor device icon 908 may represent the IoT device involved with the condition trigger 904. Similarly, each action policy 906 may be described with respect to the semantic label and context of the IoT device involved for the action policy 906. An action device icon 910 may represent the IoT device involved with the action policy 906.

Figure 9B:
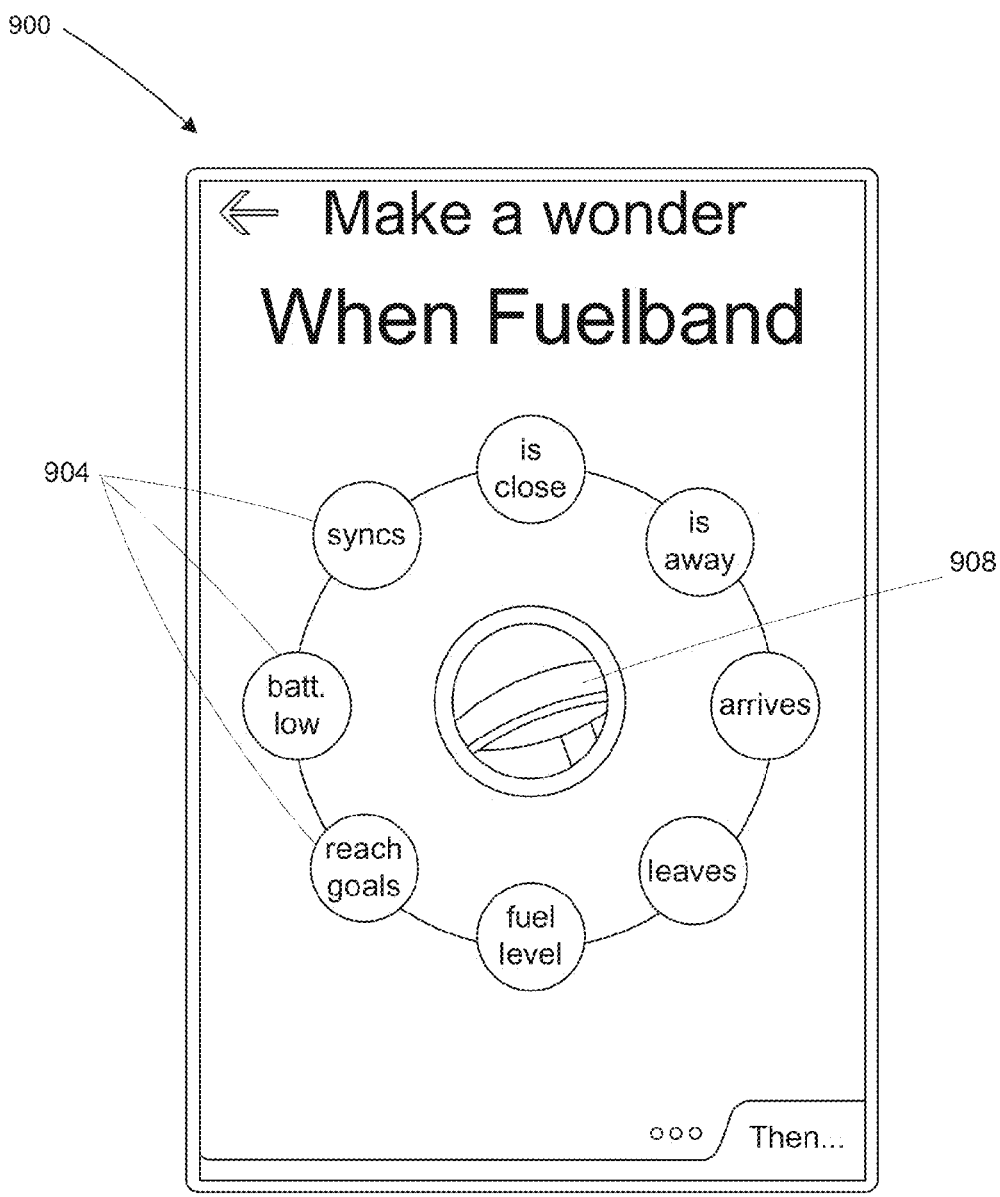
FIG. 9B is an exemplary screen shot illustrating the rule management interface of the integration platform at a condition selection stage, consistent with various embodiments of the disclosed technology.
Figure 9C:
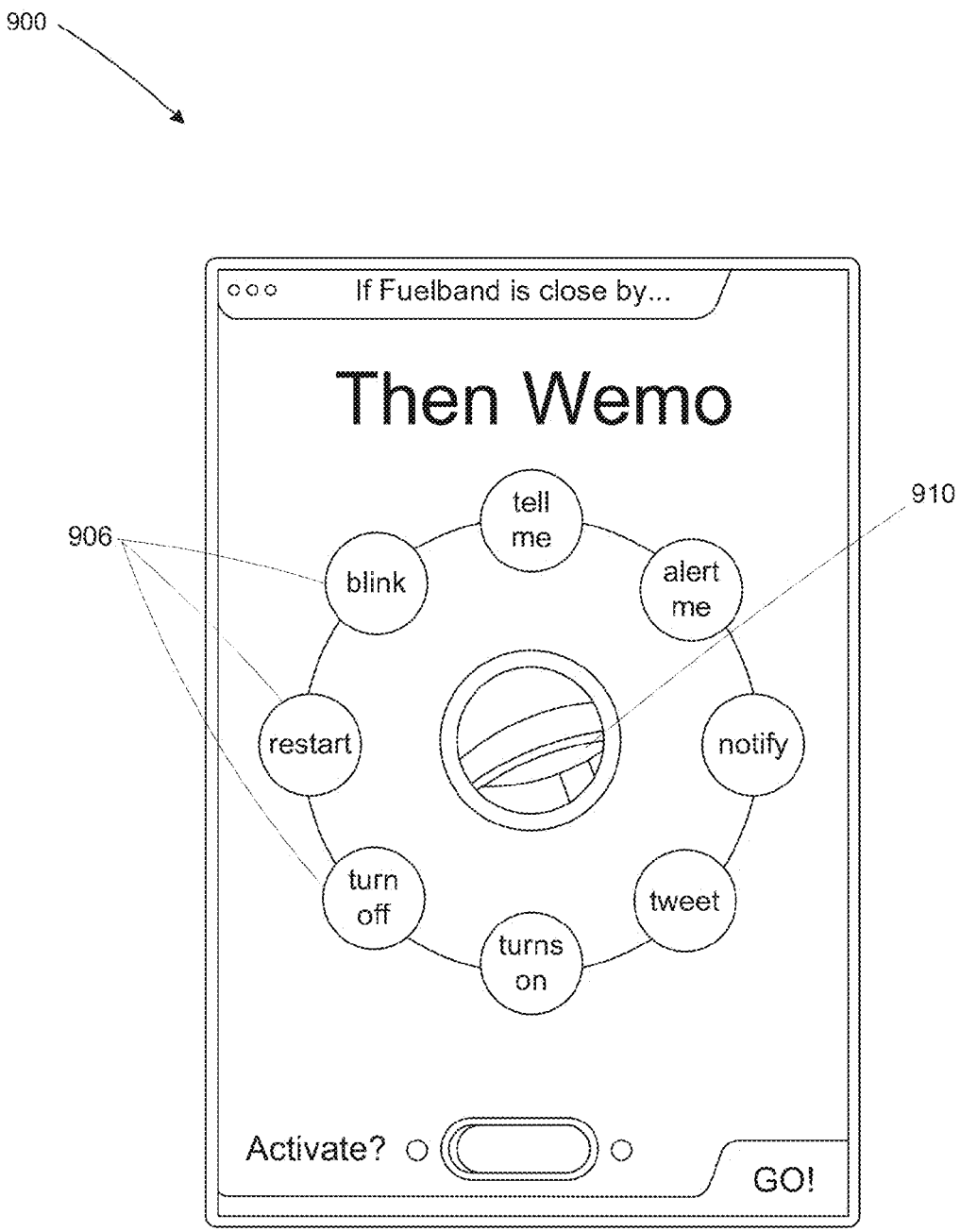
FIG. 9C is an exemplary screen shot illustrating the rule management interface of the integration at an action selection stage, consistent with various embodiments of the disclosed technology.

FIG. 9B is a screen shot of the rule management interface 900 of the integration platform at a condition selection stage, consistent with various embodiments of the disclosed technology. FIG. 9B illustrates a circle of various condition triggers 904 around the monitor device icon 908 for a user to select. FIG. 9C is a screenshot of the rule management interface 900 of the integration platform at an action selection stage, consistent with various embodiments of the disclosed technology. FIG. 9C illustrates a circle of various action policies 906 around the action device icon 910 for the user to complete the interoperable rule 902.

FIG. 10A is an exemplary screen shot 1000 illustrating the consolidation interface showing a correlative insight, consistent with various embodiments of the disclosed technology. FIG. 10A illustrates a correlative insight 1002 determined based on analysis of correlated data regarding a user's activity and glucose level as shown in the correlated data diagram 1004. FIG. 10A further illustrates an interoperable rule 1006 that may be defined and/or configured by the user in response to viewing the correlative insight 1002.

FIG. 10B is an exemplary screen shot 1050 illustrating the consolidation interface generating the interoperable rule 1006 from the correlative insight, consistent with various embodiments of the disclosed technology. The interoperable rule 1006 of FIG. 10A may be further described and/or configured. For example, the screen shot 1050 illustrates a description of a recommended interoperable rule 1006 of alerting the user when there is high activity range reached.

Figure 11A:
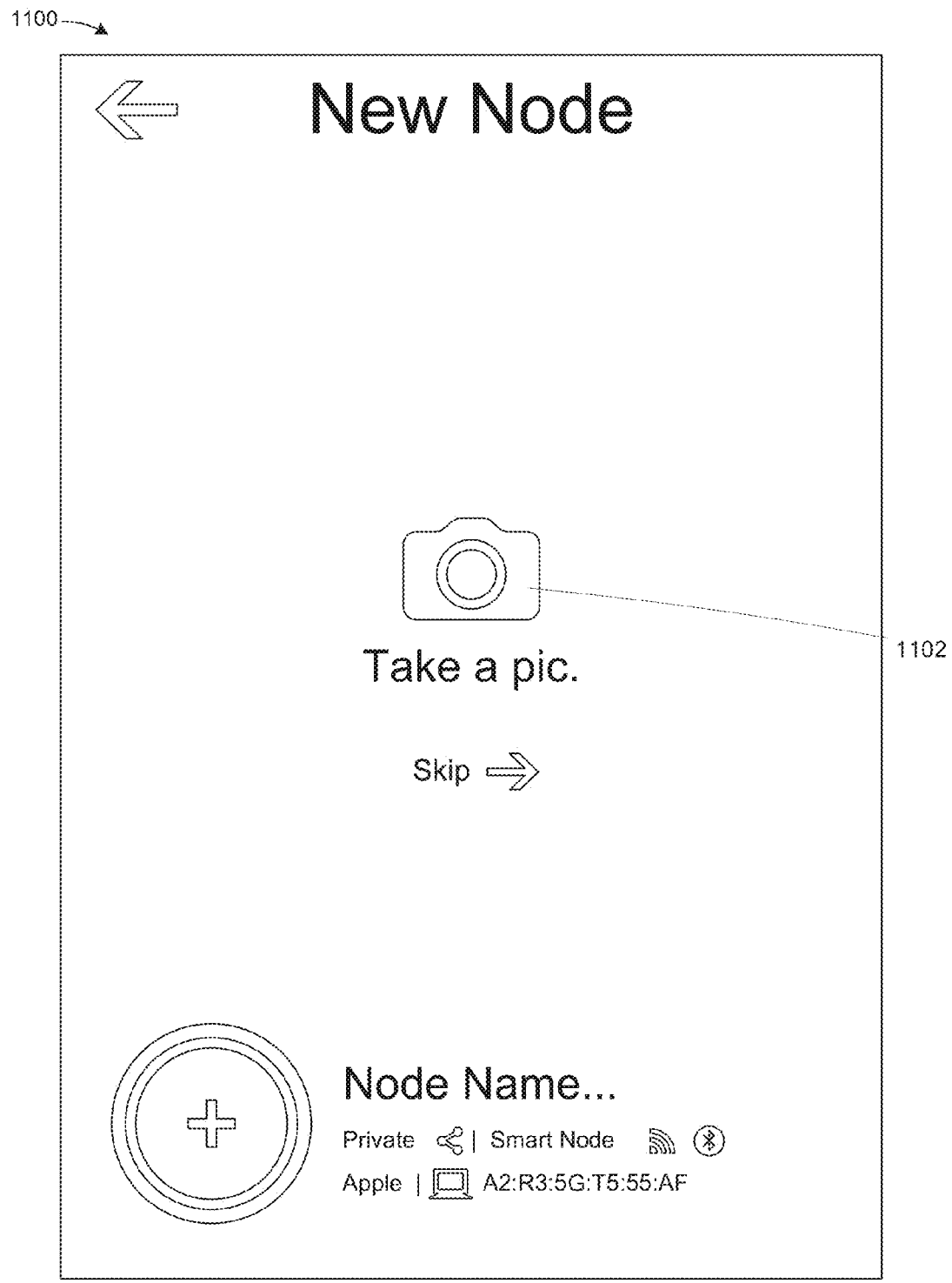
FIG. 11A is an exemplary screen shot illustrating a semantic camera interface at a first stage, the semantic camera interface used in conjunction with a life line diagram, consistent with various embodiments of the disclosed technology.

FIG. 11A is an exemplary screen shot illustrating a semantic camera interface 1100 at a first stage, the semantic camera interface used in conjunction with a life line diagram, consistent with various embodiments of the disclosed technology. At the first stage, the user is requested to add a node to the life line diagram. A semantic camera icon 1102 is shown in the center of the semantic camera interface 1100 to take a picture of node in question for labeling and/or image recognition.

Figure 11B:
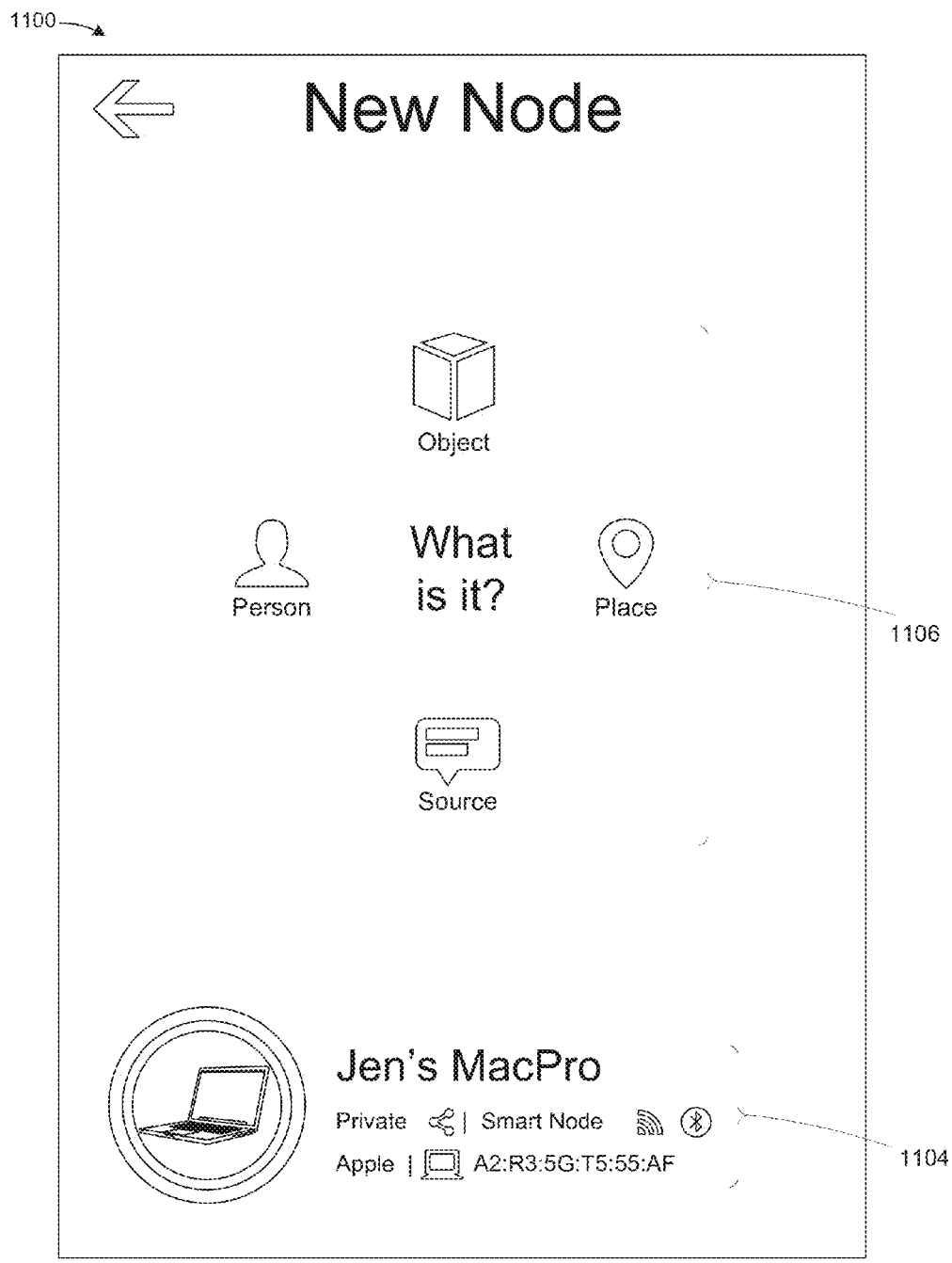
FIG. 11B is an exemplary screen shot illustrating the semantic camera interface at a second stage, the semantic camera interface used in conjunction with a life line diagram, consistent with various embodiments of the disclosed technology.

FIG. 11B is an exemplary screen shot illustrating the semantic camera interface 1100 at a second stage, the semantic camera interface used in conjunction with a life line diagram, consistent with various embodiments of the disclosed technology. At the second stage, the user is asked to semantically label a type of entity of the node added. The bottom of the screen shot shows the recognized entity 1104 associated with the node to be added as determined by the integration platform 300. The center of the screen shot shows an entity type query 1106 that requests the user to label the type of the node added.

Figure 11C:
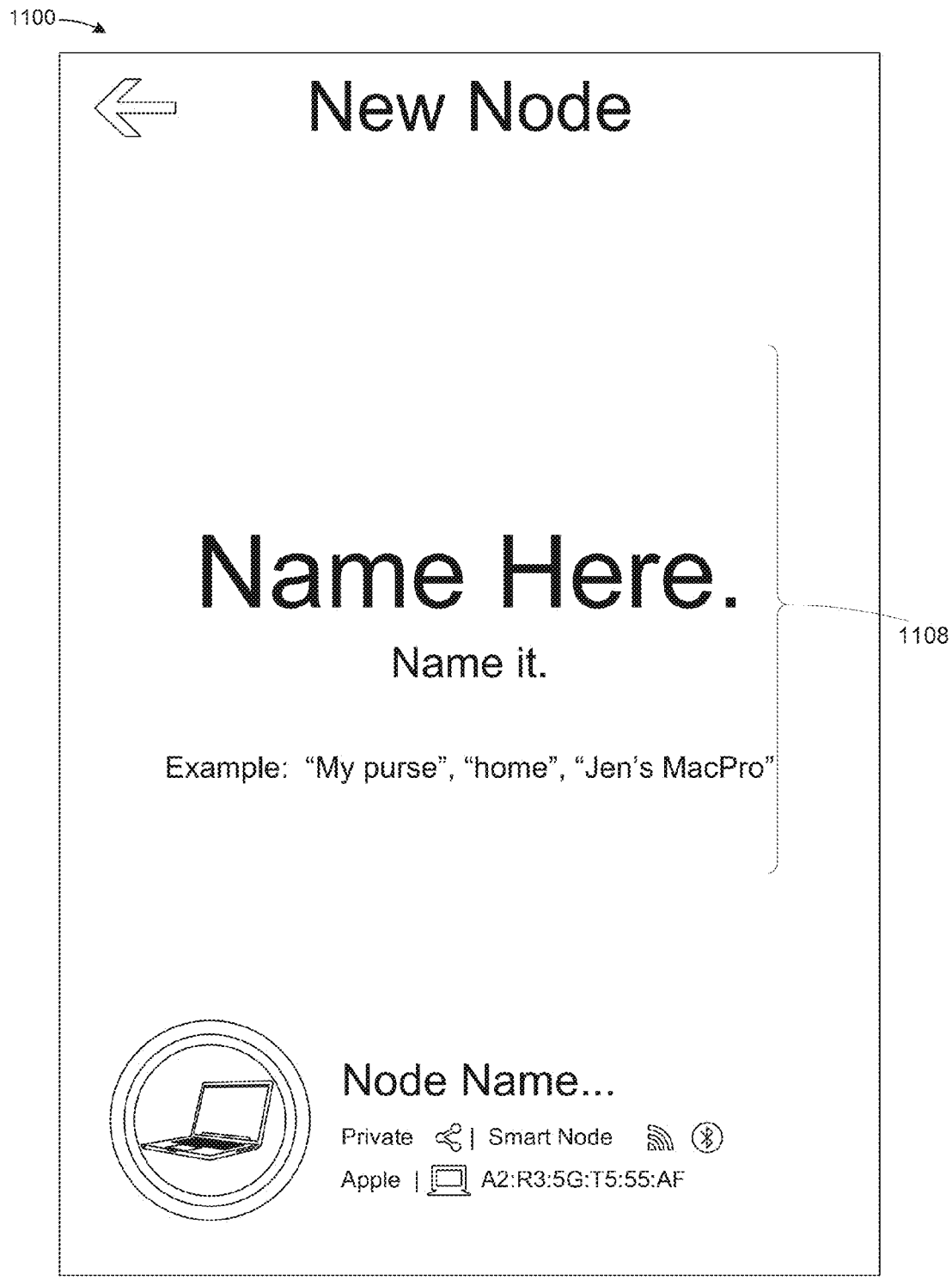
FIG. 11C is an exemplary screen shot illustrating the semantic camera interface at a third stage, the semantic camera interface used in conjunction with a life line diagram, consistent with various embodiments of the disclosed technology.

FIG. 11C is an exemplary screen shot illustrating a semantic camera interface 1100 at a third stage, the semantic camera interface used in conjunction with a life line diagram, consistent with various embodiments of the disclosed technology. At the third stage, the user is asked to semantically label the node added. The center of the screen shot shows a semantic label query 1108 that requests the user to semantically label the node added.

Figure 11D:
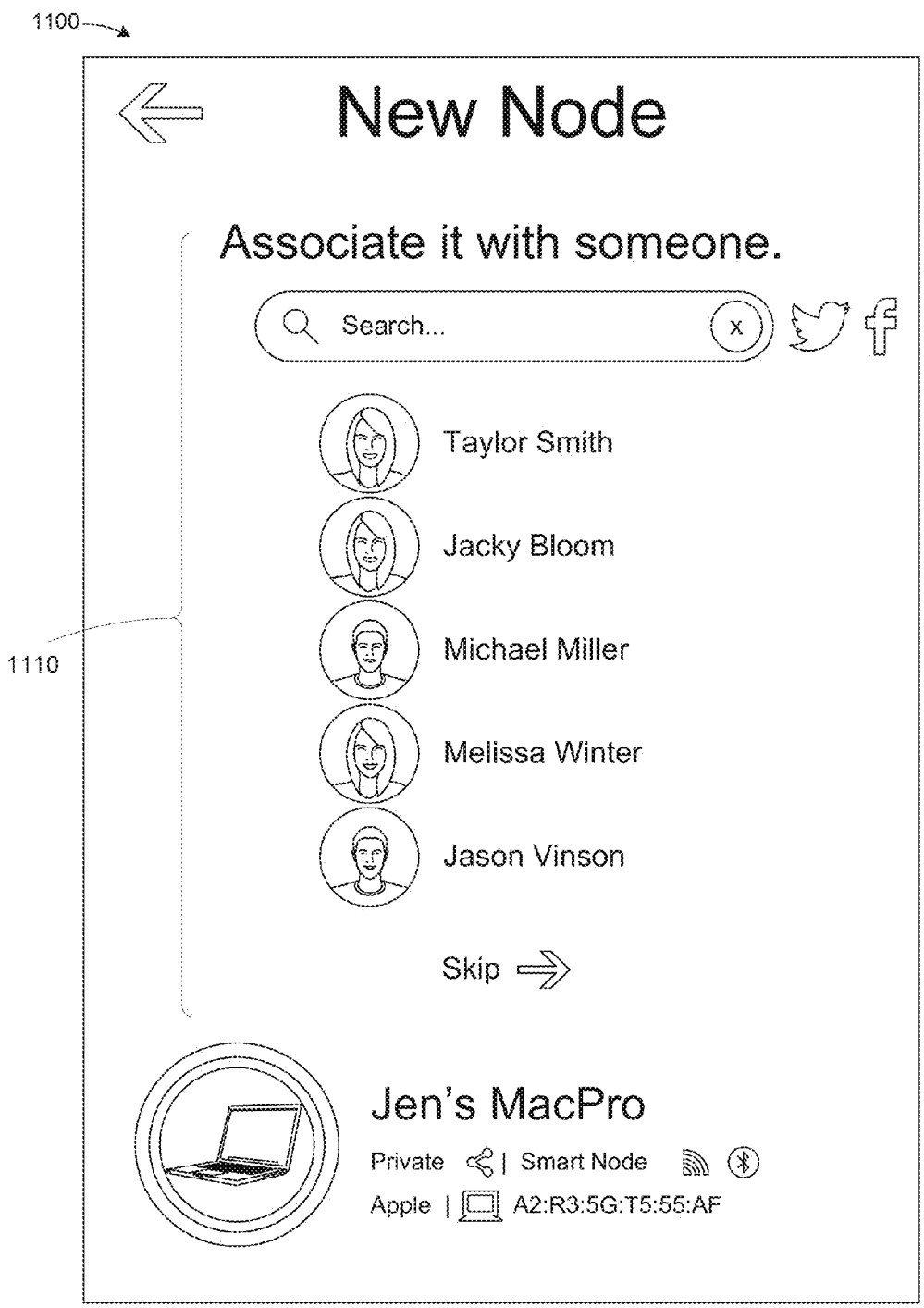
FIG. 11D is an exemplary screen shot illustrating the semantic camera interface at a fourth stage, the semantic camera interface used in conjunction with a life line diagram, consistent with various embodiments of the disclosed technology.

FIG. 11D is an exemplary screen shot illustrating a semantic camera interface 1100 at a fourth stage, the semantic camera interface used in conjunction with a life line diagram, consistent with various embodiments of the disclosed technology. At the fourth stage, the user is asked to associate the node added with one or more people. The center of the screen shot shows a social association query 1110 that requests the user to associate the node added with one or more people.

Figure 12:
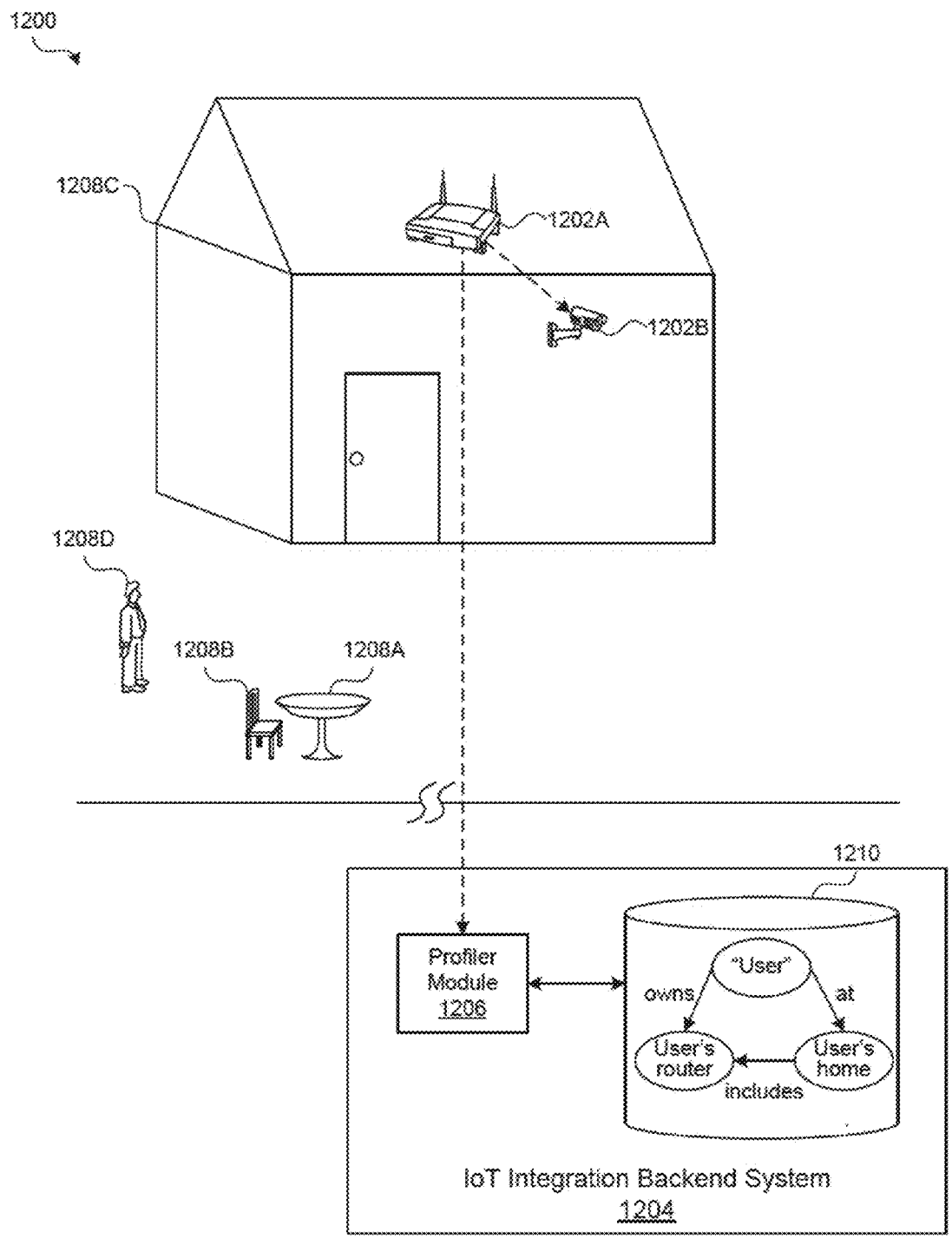
FIG. 12 is a block diagram illustrating a physical environment being profiled by IoT devices connected to an IoT integration platform.

FIG. 12 is a block diagram illustrating a physical environment 1200 being profiled by IoT devices 1202, e.g., a network router 1202A, a network-capable camera 202B, the IoT devices 102, the IoT devices 202, the IoT devices 324, or any combination thereof (collectively "the IoT devices 1202"), connected to an IoT integration backend system 1204 (e.g., the IoT integration backend system 302).

The IoT devices 1202 owned by one or more users may provide one or more data streams to the IoT integration backend system 1204. The IoT integration backend system 1204 may include a profiler module 1206, such as the environment profiler module 317 of FIG. 3. The profiler module 1206 can analyze the data streams to detect presence of relevant entities 1208, such as a first object 1208A (e.g., a table), a second object 1208B (e.g., a chair), a place/building 1208C, a person 1208D, or the IoT devices 1202. A subset of the data streams with relevant presence of the entities 1208 can then be used to construct a node graph 1210 stored on the integration backend system 1204.

For example, the node graph 1210 may include nodes with semantic labels such as: "user", "user's router", and "user's home." Each node may have an edge linked to one another denoting a relationship, such as "owns", "at", or "includes". As a specific example, the "user" owns the "user's router"; the "user" is at the "user's home"; and the "user's home" includes the "user's router." FIG. 13 further illustrates the method of constructing such node graphs.

Figure 13:
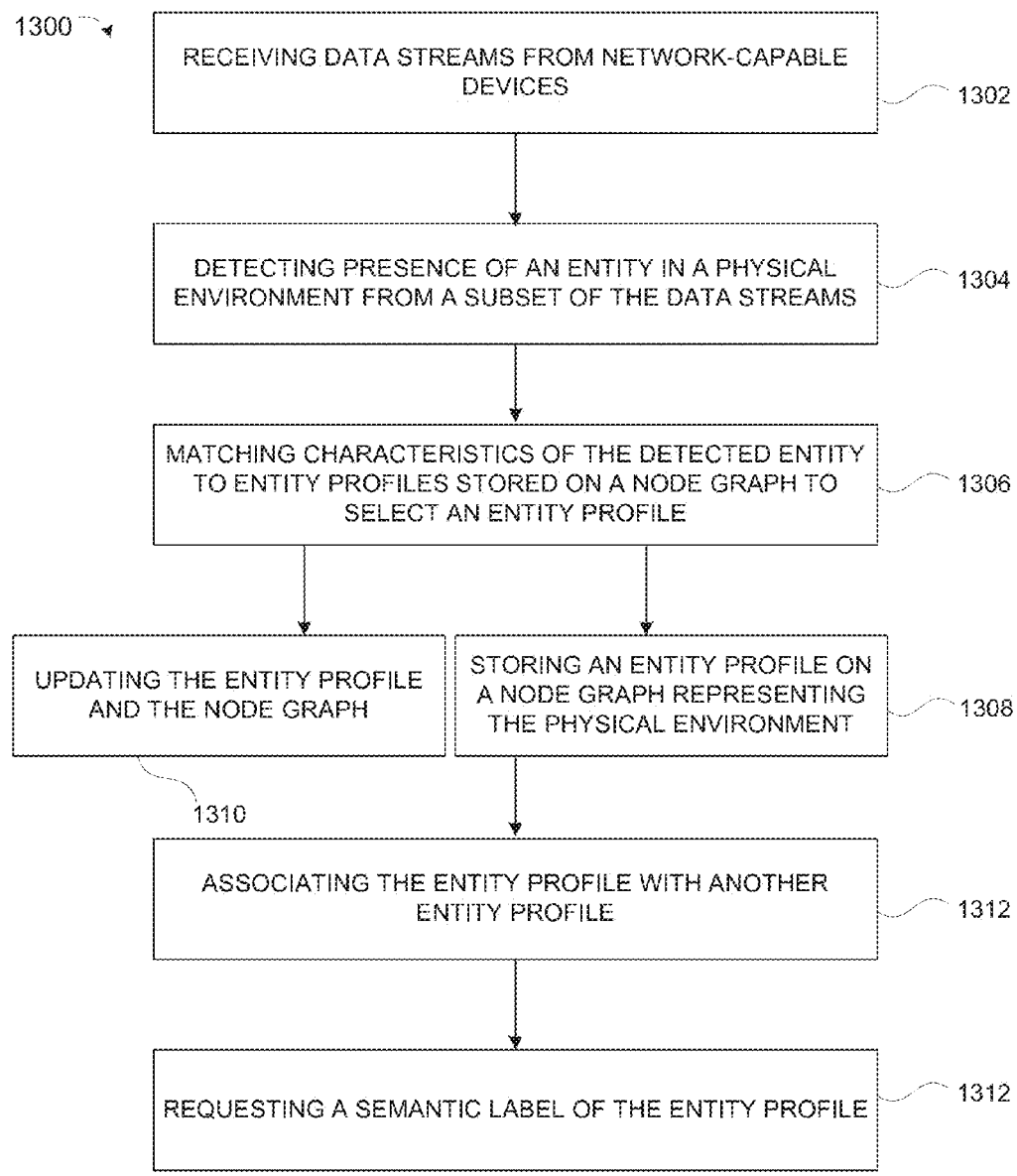
FIG. 13 is a flow diagram illustrating a method of profiling a physical environment via IoT devices connected via an IoT integration platform.

FIG. 13 is a flow diagram illustrating a method 1300 of profiling a physical environment (e.g., the physical environment 1200) via IoT devices (e.g., the IoT devices 1202) connected via an IoT integration platform (e.g., the IoT integration platform 1204). For example, the method 1300 may be performed by the environment profiler module 1206. The method 1300 includes receiving data streams from network-capable devices (e.g., the IoT devices 1202) each connected at the IoT integration platform at a step 1302.

The network capable devices may be connected to the IoT integration platform, for example, through direct connection to an integration backend server (e.g., the integration backend system 302) of the IoT integration platform. Alternatively, the network capable devices may be connected to an integration application (e.g., the integration application 328) running on a mobile device (e.g., the control device 206) within a local network shared by the mobile device and the network capable devices. The IoT integration platform, such as the integration backend system 302, may continually monitor data streams from the network capable devices and other data streams provided on the Internet, such as social media websites, news websites, other feeds and services.

The method 1300 includes a step 1304 of detecting presence of an entity in a physical environment surrounding or interacting with one or more of the network capable devices from a subset of the data streams. The entity may be a person, a place, an object, a group, a business, a media object (e.g., a song, a movie, an advertisement, or a photo), any observable objects by the network capable devices, any the relevant physical or virtual object associated with a user account, or any combination thereof.

Detecting the presence of the entity may include recognizing the entity of which is referenced by a user report activity through at least one of the network capable devices. Detecting the presence may also include recognizing a separate entity from a measurable observation of the physical environment by at least one of the network capable devices. For example, the measurable observation may be a wireless presence as seen by a router or a photograph image as captured by a web camera. Detecting the presence may further include recognizing the entity of which at least one of the network capable device has interacted with.

In response, the integration backend system may attempt to match characteristics of the detected entity to entity profiles stored on a node graph to select an entity profile that is known to be IoT integration platform in a step 1306. When the detected presence is unknown, the method 1300 includes a step 1308 of storing an entity profile on a node graph representing the physical environment. When the detected presence is known, the method 1300 includes a step 1310 of updating the entity profile and the node graph based on the subset of the data streams responsible for detecting the presence of the entity. Updating the entity profile may include updating a semantic label, an activity context, a correlative insight relevant to a user account, or any combination thereof. In various embodiments, while the entity profile may be directly associated with (e.g., owned by) a user account, and the entity profile may be updated based on the subset of the data streams from network-capable devices which are not owned by the user account. In various embodiments, while updating multiple entity profiles detected from the same subset of data streams (e.g., different entities detected on a network enabled camera or different entities detected by a router), the multiple entity profiles may be mutually associated with each other (e.g., an edge on the node graph may link the entities together).

Each node in the node graph includes at least one of the following: an edge to another node, a semantic label, an activity history, an activity or functional context, a relevant data insight related to the node, or any combination thereof. The node graph may be stored on the integration backend system, such as the integration backend system 302 or on a cloud storage server coupled to the IoT integration platform. The node graph may be accessible in generation of a user interface to a user account. A user profile node of the user account may be stored on the node graph. In various embodiments, the user interface (including logical functions in generation of the user interface) may be restricted to access a subset of nodes in the node graph where the subset is within a certain distance from the user profile node. In various embodiments, other user accounts may access the user profile node.

During the creation or updating of the entity profile, each entity profile may be associated with at least one of the network capable devices from which the presence is detected. In various embodiments, the method 1300 may further include a step 1312 of associating the entity profile with another entity profile in the node graph, where the another entity profile is other than the at least one of the network capable devices responsible for detecting the entity presence. For example, the two entity profiles may be associated based on the semantic labels of the two entity profiles. For another example, the entity profiles may be associated together based on the subset of the data streams responsible for detecting the entity presence in the first place. As a specific example, the subset of the data streams may be reports of connected devices from a wireless router, and the entities s detected by the wireless router may all be associated together (e.g., because of a shared local network or a shared geo-location). For yet another example, the entity profiles may be associated together based on data received from an external media system. As a specific example, where the entities are people, the external media system may be a social networking system where a social connection on the social networking system may translate to association between the two detected entities. Other examples of the means for association may include associations based on: physical proximity, ownership relationship, containment relationship, common functionality, shared context, interaction history, social relationship, or any combination thereof.

During the creation of the entity profile or anytime afterwards, the IoT integration platform may request from a user a semantic label of the entity profile at a step 1314. The request may be presented to a user account via one or more user interfaces. Each entity profile may have multiple semantic labels, e.g., "my home" from the perspective of Jane, who owns the house or "Jane's house" from the perspective of Bob, who is a friend of Jane. Hence, the IoT integration platform can store the semantic label returned by the user account in a semantic label cluster. The semantic label cluster can be a database storing multiple semantic labels from multiple user accounts for each entity. Any user may place user-specific semantic labels on nodes of the node graph.

In some embodiments, a set of semantic label choices may be presented to the user to select on a user interface, such as the integration interface 114 or the integration application 328. For example, the data analysis module 308 may determine the semantic label choices, such as based on performance of a contextual or semantic analysis of the presence of the entity in relation to the first user account. In various embodiments, at least one of the semantic label choices may be based on an existing semantic label set by another user account.

While processes or blocks are presented in a given order in the flow diagrams above, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed can include:

1. A method of profiling a physical environment via Internet of Things (IoT) devices connected via an IoT integration platform, comprising:
   receiving data streams from network-capable devices connected to the IoT integration platform;
   detecting presence of an entity in a physical environment surrounding or interacting with one or more of the network-capable devices from a subset of the data streams;
   storing an entity profile on a node graph representing the physical environment, wherein each entity profile is associated at least one of the network-capable device from which the presence is detected; and
   requesting a semantic label of the entity profile from a user of a first user account via one or more user interfaces, a user profile of the first user account being stored on the node graph, and the first user account being restricted from a subset of the node graph within a certain distance from the user profile.

2. The method of claim 1, further comprising storing the semantic label in a semantic label cluster for the entity profile, wherein the semantic label cluster includes semantic labels from multiple user accounts.

3. The method of claim 1, further comprising performing semantic analysis of the presence of the entity in relation to the first user account; wherein requesting the semantic label includes presenting semantic label choices for selection based on the semantic analysis.

4. The method of claim 1, wherein requesting the semantic label includes presenting semantic label choices for selection based on an existing semantic label set by a second user account.

5. The method of claim 1, wherein detecting the presence of the entity includes recognizing a separate entity from a measurable observation of the physical environment by at least one of the network-capable devices.

6. The method of claim 1, wherein detecting the presence of the entity includes recognizing the entity of which at least one of the network-capable devices has interacted with.

7. The method of claim 1, wherein detecting the presence of the entity includes recognizing the entity of which is referenced by a user-reported activity through at least one of the network-capable devices.

8. The method of claim 1, further comprising associating the entity profile with another entity profile in the node graph, wherein the another entity profile is other than the at least one of the network-capable devices.

9. The method of claim 8, wherein associating the entity profile with the another entity profile is based on the semantic label from the user account.

10. The method of claim 8, wherein associating the entity profile with the another entity profile is based on the subset of the data streams.

11. The method of claim 8, wherein associating the entity profile with the another entity profile is based on a data communication from an external media system.

12. The method of claim 8, wherein associating the entity profile with the another entity profile in the node graph is based on a physical proximity, an ownership relationship, a containment relationship, a common functionality, a shared context, an interaction history, a social relationship, or any combination thereof.

13. The method of claim 1, wherein each node in the node graph includes an edge to another node, a semantic label, an activity history, an activity or functional context, a relevant data insight related to the node, or any combination thereof.

14. The method of claim 1, wherein the one or more of the network-capable devices are connected to the IoT integration platform through an integration application capable of communicating via a local network via different device interfaces.

15. A method of profiling a physical environment via Internet of Things (IoT) devices connected via an IoT integration platform, comprising:

receiving data streams from network-capable devices connected to the IoT integration platform;

detecting presence of an entity in a physical environment surrounding or interacting with one or more of the network-capable devices from a subset of the data streams;

matching a characteristic of the entity to entity profiles stored on a node graph to select an entity profile to update; and updating the entity profile and the node graph based on the subset of the data streams, wherein a user profile of the user account is stored on the node graph and the user account is restricted to access a subset of the node graph within a certain distance from the user profile.

16. The method of claim 15, wherein each node in the node graph represents multiple semantic labels.

17. The method of claim 15, wherein updating the entity profile includes updating a semantic label, an activity context, a correlative insight relevant to a user account, or any combination thereof.

18. The method of claim 15, wherein the entity profile is directly associated with a user account; and wherein the entity profile is updated based on the subset of the data streams from network-capable devices which are not owned by the user account.

19. The method of claim 15, further comprising:

updating multiple entity profiles detected from the same subset of the data streams; and mutually associating the multiple entity profiles.

20. A computer-implemented Internet of Things (IoT) integration platform system for profiling a physical environment via IoT devices connected to the IoT integration platform system, the IoT integration platform system comprising:

a processor; and a tangible storage medium comprising instructions stored thereon, where the instructions, when executed by the processor, is configured to:

receive data streams from network-capable devices connected to the IoT integration platform;

detect presence of an entity in a physical environment surrounding or interacting with one or more of the network-capable devices from a subset of the data streams;

match characteristics of the entity to entity profiles stored on a node graph to select an entity profile, wherein a user profile of the user account is stored on the node graph and the user account is restricted to access a subset of the node graph within a certain distance from the user profile; and update the entity profile and the node graph based on the subset of the data streams.

* * * * *